United States Patent [19]
Nagao

[11] Patent Number: 5,907,549
[45] Date of Patent: May 25, 1999

[54] SIGNAL TRANSMISSION METHOD AND DEVICE

[75] Inventor: Yoshiro Nagao, Kawasaki, Japan

[73] Assignee: Fujitsu Limited, Kanagawa, Japan

[21] Appl. No.: 08/795,585

[22] Filed: Feb. 7, 1997

Related U.S. Application Data

[63] Continuation of application No. 08/590,217, Jan. 23, 1996, abandoned, which is a continuation of application No. 08/281,227, Jul. 27, 1994, abandoned.

[30] Foreign Application Priority Data

Dec. 28, 1993 [JP] Japan ..................................... 5-352368

[51] Int. Cl.⁶ .............................. H04J 3/12; H04M 11/00
[52] U.S. Cl. ...................... 370/384; 370/524; 379/93.06; 379/243
[58] Field of Search ..................................... 370/357, 360, 370/384, 522, 524; 379/93.01, 93.05, 93.06, 243, 244

[56] References Cited

U.S. PATENT DOCUMENTS

| | | | |
|---|---|---|---|
| 4,961,185 | 10/1990 | Sawada | 370/79 |
| 4,975,900 | 12/1990 | Murata et al. | 370/110.1 |
| 5,043,983 | 8/1991 | Dorst et al. | 370/110.1 |
| 5,046,183 | 9/1991 | Dorst et al. | 370/110.1 |
| 5,184,345 | 2/1993 | Sahni | 370/110.1 |
| 5,278,972 | 1/1994 | Baker et al. | 370/110.1 |
| 5,289,536 | 2/1994 | Hokari | 370/110.1 |
| 5,305,318 | 4/1994 | Ozeki et al. | 370/110.1 |
| 5,355,404 | 10/1994 | Leduc et al. | 379/201 |
| 5,448,634 | 9/1995 | Satomi et al. | 379/220 |

FOREIGN PATENT DOCUMENTS 0 365 200  4/1990  European Pat. Off. .
WO 85/05749  12/1985  WIPO .

OTHER PUBLICATIONS

"Read Your Display", 2323 Telecom Report, 16(1993)Mai/Juni, No. 3, Munchen, DE, pp. 170–171.

"The RENAN Project: Opening Up ISDN in France", Marc Trouvat, IEEE Communications Magazine, Dec. 1987–vol. 25, No. 12, pp. 64–69.

*Primary Examiner*—Alpus H. Hsu
*Attorney, Agent, or Firm*—Helfgott & Karas, P.C.

[57] ABSTRACT

The object of the present invention is to provide effective technique to inform a subscriber who is a member of a communication service of ISDN about an activated communication service accurately. The present invention relates to the method and system in which the switching system provided to control communication with each ISDN subscriber terminal and where character string showing the names of communication services are stored, writes a character string showing the names of communication service activated for a subscriber terminal to a call setup request acknowledgment signal to be sent in response to a call setup request signal from the subscriber terminal.

11 Claims, 18 Drawing Sheets

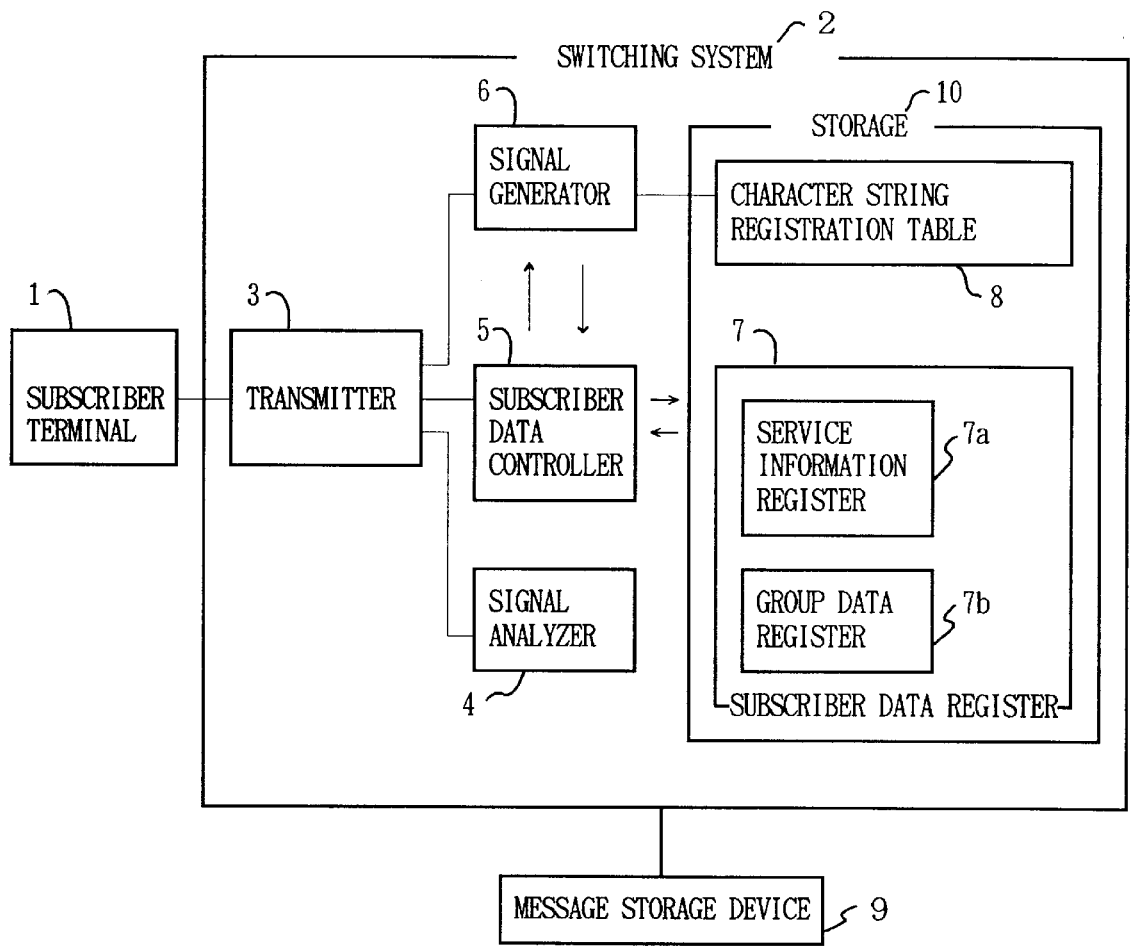
F I G. 1

| TERMINATING LINE NUMBER | AREA NO. | AREA NO. | · · · · | NUMBER OF MESSAGES |
|---|---|---|---|---|
| TERMINATING LINE NUMBER | AREA NO. | AREA NO. | · · · · | NUMBER OF MESSAGES |
| | · | · | · | · |

7a

| AREA NO. | MESSAGE AREA |
|---|---|
| AREA NO. | MESSAGE AREA |
| · | · |

FIG. 4

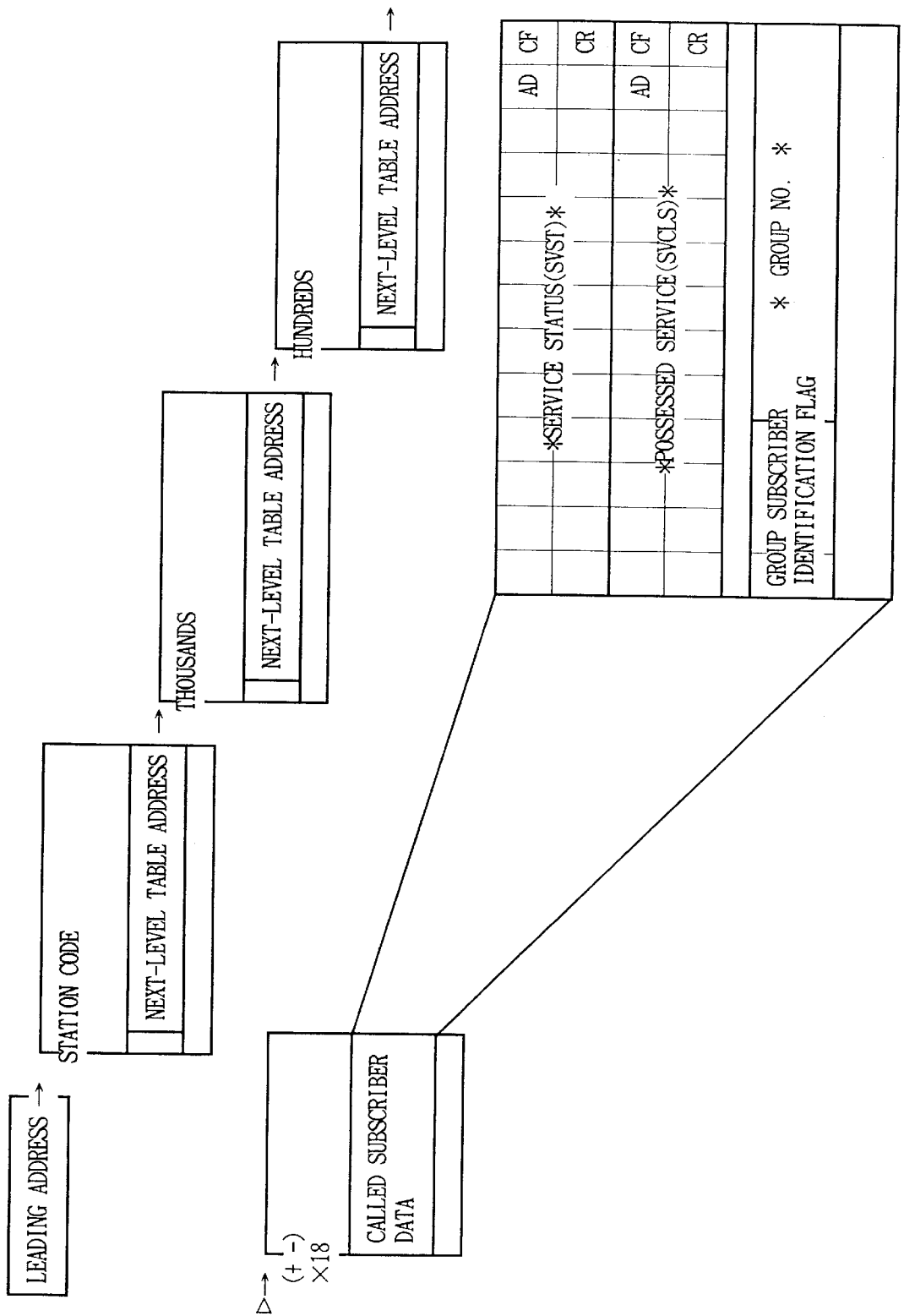
F I G. 7

| H | G | S | C | ←SERVICE NUMBER 0 |
|---|---|---|---|---|
|   |   | * |   |   |
| C | C | L | R | ←SERVICE NO.0 |
| C | C | * |   |   |
| C | L | I | R | ←SERVICE NO.1 |
|   |   | * |   |   |
| V | C | F | N | ←SERVICE NO.3 |
| R |   | * |   |   |
| S | R |   |   | ←SERVICE NO.4 |
|   |   | * |   |   |
| C | C | C | W | ←SERVICE NO.5 |
|   |   | * |   |   |
| G | M | B |   | ←SERVICE NO.6 |
|   |   | * |   |   |
|   |   | ⋮ |   | ⋮ |

FIG. 10

| IE: INFORMATION ELEMENT | DIRECTION | MANDATORY/OPTIONAL | REMARK |
|---|---|---|---|
| PROTOCOL DISCRIMINATOR | BIDIRECTIONAL | MANDATORY | INFORMATION ELEMENT TO DIFFERENTIATE FROM OTHER PROTOCOLS SUCH AS X.25 ONLY 08(MESSAGE AMONG NETWORK USERS) IN THIS INVENTION. |
| MESSAGE TYPE | BIDIRECTIONAL | MANDATORY | 0D IN CASE OF SETUP ACK MESSAGE |
| CHANNEL IDENTIFICATION | BIDIRECTIONAL | OPTIONAL | INFORMATION ELEMENT FOR DEFINING CHANNELS CONTROLLED BY THIS PROTOCOL |
| PROGRESS INDICATOR | BIDIRECTIONAL | OPTIONAL | INFORMATION ELEMENT FOR INFORMING AN EVENT CAUSED IN THE PROCESS OF SETUP OR DISCONNECTION OF CALL |
| DISPLAY | NETWORK → USER | OPTIONAL | INFROMATION ELEMENT FOR TRANSFERRING INFORMATION DISPLAYED FOR A USER ACCORDING TO IA5 |
| SIGNAL | NETWORK → USER | OPTIONAL | INFORMATION ELEMENT FOR INFORMING INFORMATION RELATED TO A TONE OR RINGING |

FIG. 11

SIGNAL TRANSMISSION METHOD AND DEVICE

This is a continuation of application Ser. No. 08/590,217, filed Jan. 23, 1996, now abandoned, which is a continuation of 08/281,227, filed on Jul. 27, 1994, now abandoned.

BACKGROUND OF THE INVENTION

1. Field of the Invention

The present invention relates to a method and a device for transmitting information from a switching system to a subscriber terminal and more particularly to such method and device that inform the subscriber of the name of a communication service related to him and the activation/deactivation of the communication service.

2. Description of the Related Art

At present, the development of communication technology allows for providing a variety of communication services to the subscribers via a telephone network. Therefore, more and more people subscribe to plural communication services. In case a subscriber is a member of plural communication services, the name of the communication service to which the subscriber has subscribed and activation/deactivation of the communication service required to be reported to the subscriber.

There are various signal transmission methods regarding communication services. For example, we can refer to the method for transmitting a voice signal indicative of the name of a communication service to a subscriber, a method for transmitting a different tone for each communication service and a method for transmitting tones respectively indicating the activation and deactivation of a communication service.

In the above-mentioned methods, aural signals or tones to identify each communication service, and aural signals or tones to differentiate activation or deactivation of each communication service are identified for a switching system or equipment connected to a switching system. When subscriber hooks up, the switching system recognizes the off-hook signal and reads aural signals or tones to differentiate the name of the communication service to which the subscriber has subscribed and activation/deactivation of the communication service. Further, the switching system sends the read aural signals or tones to the subscriber terminal.

For example, in the case of a subscriber of an analog network or ISDN, while any service is activated, the switching system sends a dial tones to identify the communication service when the subscriber hooks up. The subscriber can recognize the activated communication service by the dial tones sent by the switching system.

Some ISDN terminals are provided with a service status pilot lamp (Feature lamp). The subscriber registers service identification data to identify a communication service to an ISDN terminal. When the communication service is activated, the switching system sends the communication service identification information to identify the communication service to the ISDN terminal. When the ISDN terminal receives the communication service identification information from the switching system, the service status pilot lamp is lighted. When the communication service is deactivated the switching system sends a signal showing deactivation of a communication service to the ISDN terminal. When the ISDN terminal receives the signal from the switching system, the service status pilot lamp is put out. In detail, when a communication service is activated, the switching system identifies the ISDN terminal which is a member of the communication service. Then, the switching system sends the communication service identification information of the communication service to the ISDN terminal.

The subscriber can recognize the type of a service and activation/deactivation of the service by reference to the service status pilot lamp of the ISDN terminal. If the ISDN terminal is powered off due to any cause, the subscriber executes a "service status interrogation procedure" (Interrogation). That is, when the subscriber sends a specific signal to the provider of the communication service, it detects the status of activation of the communication service. When the provider detects the communication service is activated, it sends the communication service identification information of the communication service to the subscriber. The above-mentioned transmission of the communication service identification information allows the service status pilot lamp corresponding to activation of a communication service of the subscriber's ISDN terminal to be lit.

If a call to a subscriber of an automatic answering telephone service cannot be accepted due to a busy call or absence, the switching system transfers the call to a message storage device. When the subscriber finishes the call or hooks up the terminal after he returns, the switching system sends a dial tone showing the activation of the automatic answering telephone service to the subscriber. The subscriber can recognize the activation of the automatic answering telephone service by the dial tone and receive the calling subscriber's message from the message storage device.

In case of an ISDN terminal, the subscriber is informed of storage of a message by lighting of the service status pilot lamp corresponding to the automatic answering telephone service. However, in the case of an analog terminal, if a subscriber is a member of plural communication services, he must differentiate plural tones because the type of a communication service and activation/deactivation of the communication service are informed by dial tones. If a subscriber is a member of further more communication services, he cannot differentiate the dial tones and may not be able to know what communication service is activated.

On the other hand, in the case of ISDN, even if a terminal is provided with a service status pilot lamp (Feature lamp), the subscriber must set up the lamp for corresponding to each service and the procedure is intricate. Further, another problem that a "service status interrogation procedure (Interrogation)" must be executed for each service which leads to the intricate operation.

The automatic answering telephone service still informs the subscribers that a call to the subscriber is transferred and stored as a message by a special dial tone. The method of differentiating services by a dial tone imposes a burden on subscribers and may make a service less significant.

SUMMARY OF THE INVENTION

The inventor of the present invention turns his attention to a call setup request signal (SETUP signal) and a call setup request acknowledgment signal (SETUP ACK signal) received and sent between the switching system and the subscriber terminals in a communication network. The inventor specifies so that a character string showing the name of the communication service activated for a subscriber terminal is written to a display information element constituting the call setup acknowledgment signal (SETUP ACK signal) and is displayed on the screen of the display device of the subscriber terminal.

The signal transmission method and equipment according to the present invention will be briefly described.

(1) Signal Transmission Method

The signal transmission method according to the present invention starts with storing a character string showing the name of the communication service to which a subscriber has subscribed in the switching system. Then, when a call setup request signal is sent from the subscriber terminal to the switching system via a control signal channel, the switching system reads the character string showing the name of the communication service activated for the subscriber terminal. Next, the switching system sends the call setup request acknowledgment signal to be sent in response to the call setup request signal to which the read character string is added, to the subscriber terminal. When the subscriber terminal receives the call setup request acknowledgment signal, it detects the character string showing the name of the communication service from the call setup request acknowledgment signal and displays it on the screen. Therefore, the subscriber can recognize the communication service activated for himself as a character information.

In detail, the switching system is provided with the subscriber data registration means by which the service identification information to identify the communication service activated for each subscriber terminal is registered on the basis of terminal identification information to identify each subscriber terminal. Further, the switching system is provided with the character string registration table in which a character string showing the name of each communication service is registered on the basis of service identification information. When the switching system receives a call setup request signal from a subscriber terminal, it executes a signal analysis step, a service information detection step, a character string detection step, a signal generation step and a signal transmission step in turn.

In the signal analysis step, the switching system analyzes a call setup request signal, judges whether or not the signal contains the terminating line number and detects the terminal identification information of the subscriber terminal if the signal contains no terminating line number.

In the service information detection step, the switching system retrieves the subscriber data registration means according to the terminal identification information detected in the signal analysis step and detects the service identification information of a communication service activated for the subscriber terminal.

In the character string detection step, the switching system retrieves the character string registration table according to the service identification information detected in the service information detection step and detects the character string showing the name of the communication service activated for the subscriber terminal.

In the signal generation step, the switching system adds the character string detected in the character string detection step to a call setup request acknowledgment signal to be sent in response to the call setup request signal.

In the signal transmission step, the switching system sends the call setup request acknowledgment signal generated in the signal generation step to the subscriber terminal via a control signal channel.

Further, the case that a message storage device is connected to the switching system will be described. A message storage device once stores a message of a calling party to a subscriber terminal not responding to the call by the calling party and sends the message according to a request from the subscriber terminal. The message storage device according to the present invention executes the step of sending the terminal identification information of a subscriber terminal and the number of messages stored in the message storage device for the subscriber terminal to the switching system when a message for the subscriber terminal is stored. Corresponding to the above-mentioned step, the number of messages stored in the message storage device for each subscriber terminal is registered in addition to the service identification information of a communication service activated for each subscriber terminal in the subscriber data registration means of the switching system. When the terminal identification information and the number of messages stored in the message storage device for each subscriber terminal are sent from the message storage device to the switching system, the switching system executes a step of retrieving the subscriber data registration means according to the terminal identification information received from the message storage device and updating the number of messages stored in the message storage device for the subscriber terminal by the one received from the message storage device.

The signal transmission method in case a subscriber terminal is a member of a communication service and at the same time, a group of the subscriber terminals of which the subscriber terminal is a member, is a member of the communication service, will be described.

In this case, the subscriber data registration means are provided with a service information register and a group data register.

The service information register registers the service identification information of a communication service activated for each subscriber terminal on the basis of terminal identification information to identify each subscriber terminal.

The group data register registers the service identification information of a communication service activated for each group on the basis of group identification information of a group of subscriber terminals to which a subscriber terminal belongs.

When the switching system receives a call setup request signal from a subscriber terminal, it executes a signal analysis step consisting of analyzing the call setup request signal, judging whether the signal contains the terminating line number or not and detecting the terminal identification information of the subscriber terminal from the call setup request signal if the signal contains no terminating line number. Next, the switching system executes a service information detection step consisting of detecting the service identification information of a communication service activated for the subscriber terminal by retrieving the service information register according to the terminal identification information detected in the signal analysis step and at the same time, detecting the service identification information of a communication service activated for a group of subscriber terminals to which the subscriber terminal belongs by retrieving the group data register. Then, the switching system executes a character string detection step consisting of retrieving a character string registration table according to the service identification information detected in the service information detection step and detecting the character string showing the name of a communication service activated for a subscriber terminal and the character string showing the name of a communication service activated for a group of subscriber terminals of which the subscriber terminal is a member. Further, the switching system executes a signal generation step in which the character string detected in the character string detection step is added to a call setup request acknowledgment signal to be sent to the subscriber terminal and a signal transmission step in which the call setup request acknowledgment signal generated in the signal generation step is sent to the subscriber terminal via a control channel.

(2) Signal Transmitter

The signal transmitter according to the present invention connects subscriber terminals and the switching system via a communication line consisting of a control signal channel and a message channel. The switching system is constituted by storage means, signal generation means, subscriber data management means and transmission means.

In the storage means, a character string showing the name of a communication service activated for each subscriber terminal is registered.

The subscriber data management means reads data stored in the storage means and modifies or writes the data. In concrete, when the subscriber data management means receives a call setup request signal from a subscriber terminal, they read the service identification information of a communication service activated for the subscriber terminal from the storage means.

The signal generation means retrieves the storage means according to the service identification information read by the subscriber data management means and reads a character string showing the name of the communication service. Then, the signal generation means adds the character string to a call setup request acknowledgment signal to be sent in response to the call setup request.

The signal transmission means sends the call setup request acknowledgment signal generated by the signal generation means to the subscriber terminal via the control signal channel.

However, only if the call setup request signal contains no terminating line number, the signal generation means may add the character string to the setup request acknowledgment signal. In this case, the switching system must be provided with signal analysis means for judging whether or not a call setup request signal contains the terminating line number and detecting the terminal identification information from the call setup request signal if the signal contains no terminating line number. When the signal analysis means judges that a call setup request signal contains no terminating line number, the subscriber data management means reads the service identification information of a communication service activated for the subscriber terminal from storage means. Then, signal generation means reads the character string correspondent to the service identification information from storage means and adds it to a call setup request acknowledgment signal.

Storage means also may be provided with subscriber data registration means to register the service identification information of a communication service activated for each subscriber terminal on the basis of terminal identification information, and a character string registration table in which a character string showing the name of each communication service is registered on the basis of service identification information. In this case, when the switching system receives a call setup request signal from a subscriber terminal, it activates the signal analysis means. The signal analysis means detects the terminal identification information of the subscriber terminal if the call setup request signal contains no terminating line number. The subscriber data management means retrieves subscriber data registration means according to the terminal identification information detected by the signal analysis means and detects the service identification information of a communication service activated for the subscriber terminal. Then, the signal generation means retrieves a character string registration table according to the service identification information and detects the character string showing the name of a communication service activated for the subscriber terminal. Further, the signal generation means adds the character string to a call setup request acknowledgment signal and transfers it to transmission means.

The transmission means sends the call setup request acknowledgment signal generated by the signal generation means to the subscriber terminal via the control signal channel. Therefore, the subscriber terminal can read the character string from the call setup request acknowledgment signal and display it on the screen.

If a message storage device is connected to the switching system, the area to register the number of messages stored in the message storage device in addition to service identification information must be provided in the subscriber data registration means. In this case, the message storage device is provided with the facility for informing the switching system about the number of messages for a subscriber terminal every time a new message for the subscriber terminal is stored. The subscriber data management means also must be provided with the facility for updating the number of messages registered in the subscriber data registration means by the one informed by the message storage device.

Further, the subscriber data registration means may be constituted by a service information register to register the service identification information of a communication service activated for each subscriber terminal on the basis of terminal identification information of each subscriber terminal, and a group data register to register the service identification information of a communication service activated for each group of subscriber terminals on the basis of group identification information to identify the group of subscriber terminals of which each subscriber terminal is a member. In this case, the subscriber data management means retrieves the service information register according to the terminal identification information of a subscriber terminal, and detects the service identification information of a communication service activated for the subscriber terminal and the group identification information of a group of subscriber terminals of which a subscriber terminal is member. At the same time, the subscriber data management means retrieves the group data register according to the group identification information and detects the service identification information of a communication service activated for a group of subscriber terminals of which the subscriber terminal is a member. Then, the signal generation means retrieves a character string registration table according to the service identification information detected by the subscriber data management means, detects the character string showing the name of a communication service activated for a subscriber terminal and the character string showing the name of a communication service activated for a group of subscriber terminals of which the subscriber terminal is a member, and adds these character strings to a call setup request acknowledgment signal.

BRIEF DESCRIPTION OF THE DRAWINGS

FIG. 1 shows a block diagram of a signal transmitter according to embodiment a first of the present invention.;

FIG. 4 shows an example of a subscriber database according to the second embodiment;

FIG. 7 shows an example of data division of subscribers of the called party according to the second embodiment;

FIG. 10 shows an example of a character string registration table according to the second embodiment;

FIG. 11 is a table showing the configuration of a SETUP ACK signal according to the second embodiment;

DESCRIPTION OF PREFERRED EMBODIMENTS

Figure 2:
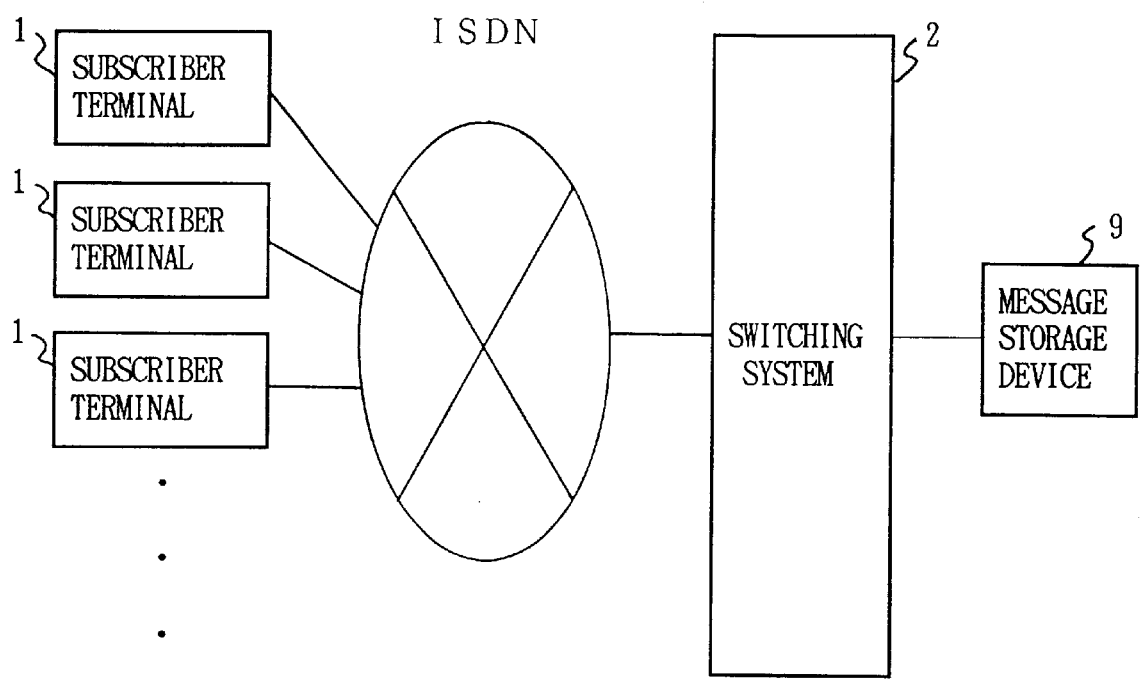
FIG. 2 shows an overall block diagram of the communication network according to a second embodiment.

Embodiments according to the present invention will be described in reference to the drawings.

First Embodiment

The signal transmitter according to the first embodiment will be described in reference to FIG. 1.

The signal transmitter is provided in a switching system 2 for ISDN. Plural subscriber terminals 1 and a communication line are connected to the switching system 2 and the communication line is constituted by a control signal channel and a message channel. Further, a message storage device 9 is connected to the switching system 2. The message storage device 9 stores a message or messages for a subscriber terminal 1 in case the subscriber terminal 1 makes no response to an incoming call and sends the stored message or messages to the subscriber terminal by any request from the subscriber terminal 1. The message storage device 9 according to the first embodiment is provided with the facility for informing the switching system 2 about the terminal identification information of the subscriber terminal 1 and the number of stored messages for a subscriber terminal 1 every time a new message for the subscriber terminal 1 is stored.

The signal transmitter is constituted by a transmitter 3, a signal analyzer 4, a storage 10, a subscriber data controller 5 and a signal generator 6.

The transmitter 3 sends a call setup request acknowledgment signal via a control signal channel in response to a call setup request signal from a subscriber terminal 1.

The signal analyzer 4 analyzes the call setup request signal, judges whether the signal contains the terminating line number or not, and detects the terminal identification information of a subscriber terminal 1 from the call setup request signal in case the signal contains no terminating line number.

The storage 10 is provided with a character string registration table 8 and a subscriber data register 7. The subscriber data register 7 is provided with a service information register 7a for registering the service identification information of a communication service activated for each subscriber terminal on the basis of terminal identification information of each subscriber terminal 1, and a group data register 7b for registering the service identification information of a communication service activated for each group of subscriber terminals on the basis of group identification information of the group of subscriber terminals of which the subscriber terminal 1 is a member. Further, the service information register 7a is provided with the area for registering the number of stored messages for each subscriber terminal on the basis of terminal identification information.

The character string registration table 8 is for registering a character string showing the name of each communication service on the basis of service identification information.

The subscriber data controller 5 reads data stored in the storage 10, modifies the data and writes the modified data. In concrete, the subscriber data controller 5 retrieves the subscriber data register 7 according to the terminal identification information detected by the signal analyzer 4 and reads the service identification information of the communication service activated for a subscriber terminal 1. When the subscriber data controller 5 receives the terminal identification information and the number of stored messages from the message storage device 9, it also retrieves the subscriber data register 7 according to the terminal identification information and updates the number of stored messages for a subscriber terminal 1 by the one received from the message storage device 9.

The signal generator 6 retrieves the character string registration table 8 according to the service identification information read by the subscriber data controller 5 and detects a character string showing the name of a communication service activated for a subscriber terminal 1. Then, the signal generator 6 writes a character string showing the name of a communication service activated for the subscriber terminal 1 to the display information element of a call setup request acknowledgment signal.

The process of operations by the signal transmitter will be now described.

If a subscriber terminal 1 makes no response to an incoming call, the message storage device 9 once stores the terminal identification information of the subscriber terminal 1 and a message from the calling party to the subscriber terminal 1. At this time, the message storage device 9 informs the switching system 2 about the terminal identification of a subscriber terminal 1 and the number of stored messages for the subscriber terminal 1.

When the switching system 2 receives the terminal identification information and the number of stored messages from the message storage device 9, it activates the signal transmitter. Then, the subscriber data controller 5 of the signal transmitter retrieves the service information register 7a according to the terminal identification information and updates the number of stored messages for the subscriber terminal 1 by the one received from the message storage device 9.

When the switching system 2 receives a call setup request signal from a subscriber terminal 1, it activates the signal transmitter. Then, the signal analyzer 4 of the signal transmitter judges whether the call setup request signal contains the terminating line number by analyzing the signal. If the call setup request signal contains no terminating line number, the signal analyzer 4 detects the terminal identification information of the subscriber terminal 1 and informs the subscriber data controller 5 about it.

The subscriber data controller 5 retrieves the subscriber data register 7 according to the terminal identification information and reads the service identification information of a communication service activated for the subscriber terminal 1, the service identification information of a communication service activated for a group of subscriber terminals of which the subscriber terminal 1 is a member and the number of stored messages for the subscriber terminal. In detail, the subscriber data controller 5 retrieves the service information register 7a according to the terminal identification information and reads the service identification information of a communication service activated for the subscriber terminal 1 and the number of stored messages. At the same time, the subscriber data controller 5 retrieves the group data register 7b and reads the service identification information of a communication service activated for a group of subscriber terminals of which the subscriber terminal 1 is a member. Then, the subscriber data controller 5 informs the signal generator 6 about the read service identification information. The signal generator 6 retrieves the character string registration table 8 according to the service identification information informed by the subscriber data controller 5 and detects a character string showing the name of a communication service activated for the subscriber terminal 1 and a character string showing the name of a communication service activated for a group of subscriber terminals of which the subscriber terminal 1 is a member. Then, the signal generator 6 writes character strings and the number of stored messages to the display information element of a call setup request acknowledgment signal to be sent to the subscriber terminal 1.

The transmitter 3 sends a call setup request acknowledgment signal generated by the signal generator 6 to the subscriber terminal 1 via a control signal channel.

The subscriber terminal 1 reads character strings and the number of stored messages from the display information element of a call setup request acknowledgment signal received via a control signal channel and displays them on the screen. Therefore, subscribers can recognize the communication service activated for themselves as character information and at the same time, can recognize the number of stored messages for themselves.

Second Embodiment

The signal transmitter according to the present invention will be described more concretely.

FIG. 2 shows an overall block diagram of the communication network according to the second embodiment.

The signal transmission system is provided with plural subscriber terminals 1, a switching system 2 to control the communication between or among these subscriber terminals 1 and a message storage device 9 connected to the switching system 2 in ISDN.

The functions of the above-mentioned devices and system will be described.

The subscriber terminal 1 is provided with a display device on the screen of which the identified information is displayed and is provided with a function to judge the display information element of a call setup request acknowledgment signal (SETUP ACK signal) sent by the switching system 2 and to display the data written to the display information element on the screen.

Figure 3:
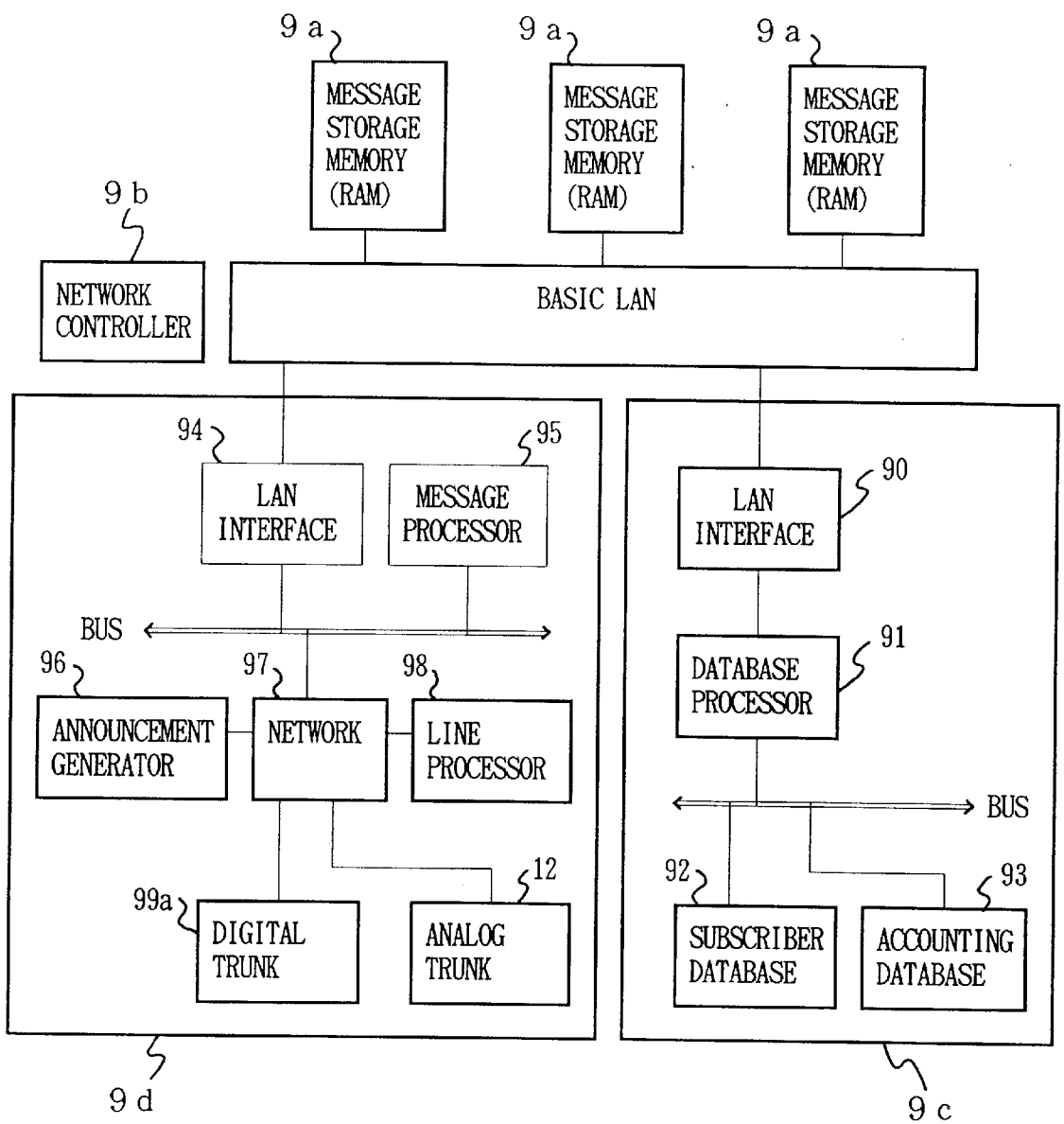
FIG. 3 shows a block diagram of a message storage device.

FIG. 3 shows the configuration of each facility of a message storage device 9.

The message storage device 9 according to embodiment 2 is a storage of aural messages of the calling party for a subscriber terminal 1 of an automatic answering telephone service. The message storage device 9 is provided with plural message storage memories 9a for storing aural messages, a network controller 9b for controlling connection between nodes of LAN such as message storage memories, a database controller 9c for storing the information of an independent subscriber terminal 1 and a message controller 9d for sending and receiving information to/from the switching system 2. The above-mentioned memories and controllers are connected via the basic LAN 7.

Further, the database controller 9c is provided with a database processor 91 via LAN interface 90. A subscriber database 92 and an accounting database 93 are connected to the database processor 91 via a bus.

The subscriber database 92 stores the area number showing the area in the message storage memory 9a in which a message for a subscriber terminal 1 is stored and the number of stored messages for the subscriber terminal 1 on the basis of terminating line number of a subscriber terminal 1, (See FIG. 4.)

The accounting database 93 stores the charge for utilizing the automatic answering telephone service on the basis of terminating line number of a subscriber terminal 1.

The database processor 91 writes, reads and updates data to/from/of the subscriber database 92 and the accounting database 93.

A message processor 95 and a network 99 are connected to the message controller 9d via LAN interface 94. Further, an announcement generator 96, a line processor 98, a digital trunk 99a and an analog trunk 99b are connected to the network 99.

The message processor 95 issues a write instruction of the accounting data to the database controller 9c and a retrieval instruction of the subscriber data, and reads messages from the message storage memories of the database controller 9c.

The announcement generator 96 is a unit for generating aural messages explaining the procedures to store and to read messages.

The network 99 provides voice path among the trunks, the announcement generator and basic LAN.

The line processor 98 controls connection or disconnection of the above-mentioned voice path. When a called subscriber terminal 1 makes no response in case an incoming call is made to the subscriber terminal 1, the line is identified between the calling subscriber terminal and the message storage device 9.

In the message storage device 9, the message controller 9d sends a message showing the message storage procedure to the calling subscriber terminal. When a message in response to the above-mentioned message is received from the calling subscriber terminal, the message is stored in a free area in the message storage memory 9a. Further, the message controller 9d informs the database controller 9c about the area number showing the area in which the message is stored, and the terminating line numbers of the calling and the called subscriber terminals 1.

In the database controller 9c, the database processor 91 accesses to the subscriber database 92 according to the terminating line number of the called subscriber terminal 1. Then, the database processor 91 stores the above-mentioned terminating line number of the calling subscriber terminal and the area number. The database processor 91 also accesses to the accounting database 93 and updates the accounting data related to the above-mentioned called subscriber terminal 1.

On the other hand, when the database controller 9c receives a message send request from the called subscriber terminal 1, the database processor 91 accesses to the subscriber database 92 according to the terminating line number of the called subscriber terminal 1. Then, the database processor 91 informs the message controller 9d about the terminating line number of the calling subscriber terminal and the area number.

The message controller 9d accesses to the message storage memory 9c according to the above-mentioned area number and reads a message for the called subscriber terminal 1. The message controller 9d also adds the terminating line number of the calling subscriber terminal to each message and sends it to the called subscriber terminal 1.

Further, when a message for a subscriber terminal 1 is stored, the message storage device 9 according to the second embodiment informs the switching system 2 about the terminating line number of the subscriber terminal 1 and the number of messages.

Figure 5:
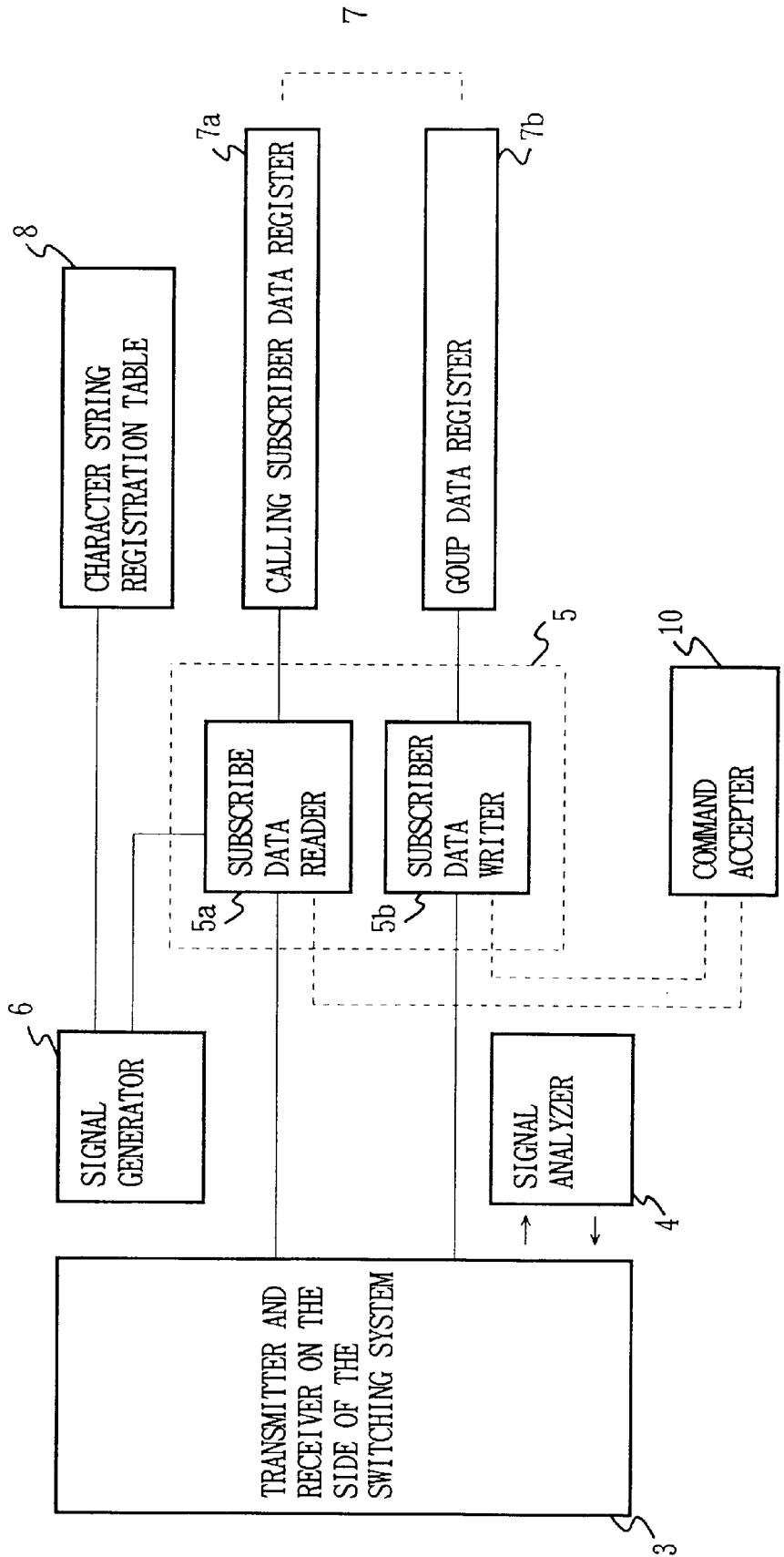
FIG. 5 shows a block diagram of a signal transmitter according to the second embodiment.

Next, the configuration of a signal transmitter according to the second embodiment will be described. When a main processor (MPR) and a call processor (CPR) provided to a switching system 2 execute the program stored in memory, the signal transmitter is activated. FIG. 5 is a block diagram showing the processing executed by the main processor (MPR), the call processor (CPR) and the program on the basis of function.

The signal transmitter is constituted by:

a subscriber terminal 1; or transmitter and receiver 3 on the side of the switching system which send and receive information to/from a message storage device 9; and a signal analyzer 4 for judging the attribute of the signal received by the transmitter and receiver 3 on the side of the switching system. A subscriber data controller 5 is provided for judging a communication service activated for a subscriber terminal 1 of the requesting party when the signal analyzer 4 detects a call setup request signal (SETUP signal) without the terminating line number. A signal generator 6 writes a character string showing the name of a communication service judged by the subscriber data controller 5 to a call setup request acknowledgment signal to be sent to the subscriber terminal 1.

Further, a data storage area of the memory according to the second embodiment is provided with a character string registration table 8, a subscriber data division 7 for registering the information related to an independent subscriber terminal 1 and a command acceptor 10 for accepting commands from an operator or the message storage device 9.

The functions of the above-mentioned divisions will be described in detail.

First, the character string registration table 8 is for registering a character string showing the name of a communication service on the basis of service identification information to identify a communication service.

The subscriber data division 7 is provided with the facility for registering the accounting information and communication service information corresponding to each subscriber terminal. However, in the second embodiment, the description of information except a communication service will be omitted. The subscriber data division 7 according to the second embodiment is provided with a subscriber data register 7a for registering the information related to a communication service activated for an independent subscriber terminal 1 and a group data register 7b for registering the information related to a communication service activated for a group of subscriber terminals of which each subscriber terminal 1 is a member.

The subscriber data register 7a stores the identification information of the activated communication service of communication services of which each subscriber terminal 1 is a member.

On the other hand, in the group data register 7b, the information to identify whether the communication service of which each group is a member is activated or not is registered on the basis of group identification information (representative terminating line number) to identify a group of communication services of which an independent subscriber terminal 1 is a member. The subscriber data division 7 will be described in detail below.

Next, when transmitter and receiver 3 on the side of a switching system receives a call setup request signal (SETUP signal) from a subscriber terminal 1, the signal analyzer 4 is provided with the facility for judging whether the call setup request signal (SETUP signal) contains the terminating line number by analyzing the signal.

The subscriber data controller 5 is provided with the facility to retrieve the subscriber data division 7 according to the terminating line number of the subscriber terminal 1 of the requesting party when the subscriber data controller 5 receives a call setup request signal (SETUP signal) without the terminating line number and to judge whether or not a communication service activated for the subscriber terminal 1 exists and whether or not a communication service activated for a group of communication services of which the subscriber terminal 1 is a member exists.

In detail, the subscriber data controller 5 is provided with a subscriber data reader 5a to retrieve the subscriber data division 7 and to read the information of an activated communication service, and a subscriber data writer 5b to rewrite or to update the contents of the subscriber data division 7 according to the commands accepted by the command acceptor 10.

Figure 6:
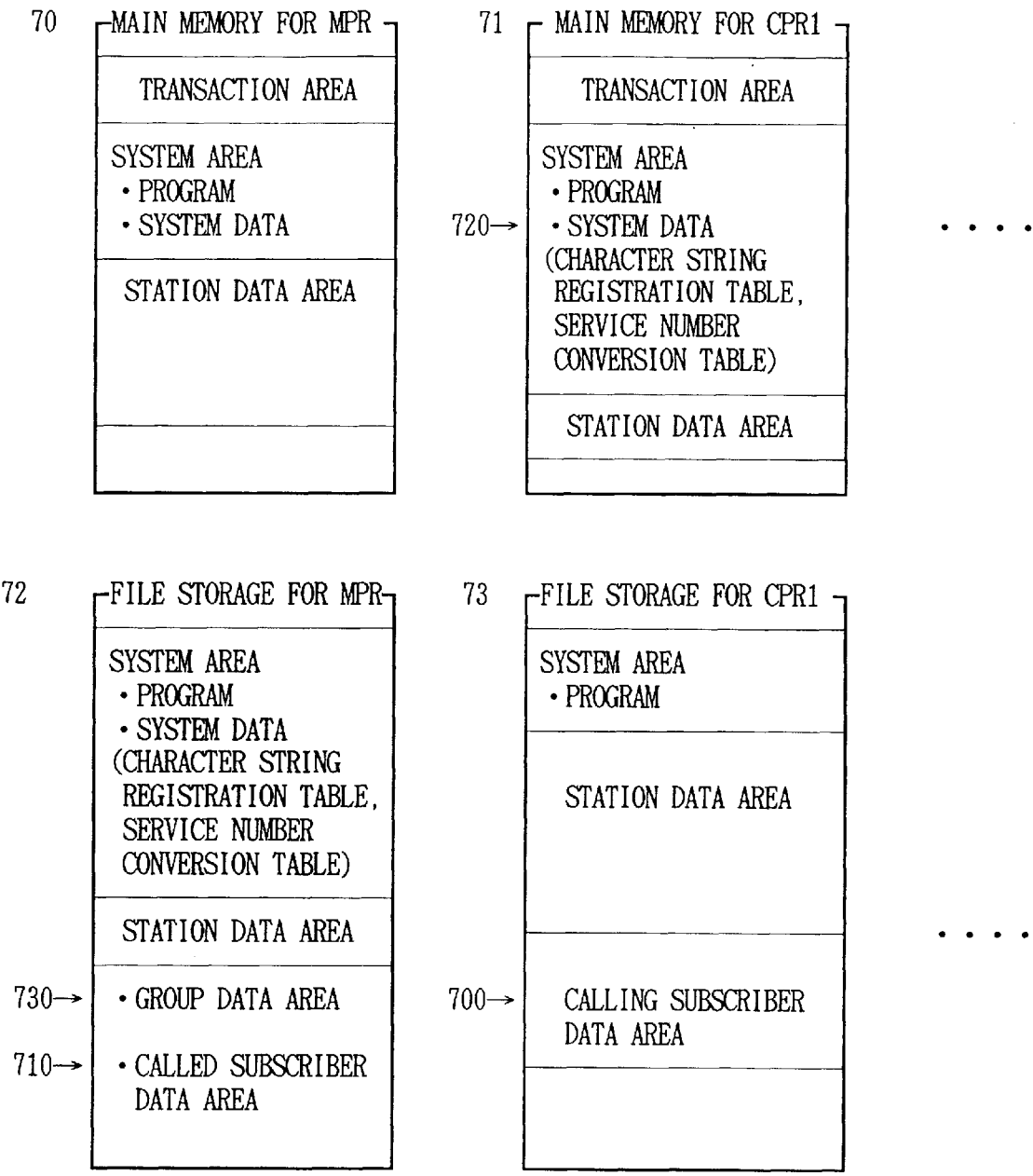
FIG. 6 shows an example of configuration of memory according to the second embodiment.

The subscriber data division 7 will be now described in detail with reference to FIG. 6.

The subscriber data register 7a is constituted by the calling subscriber data division 700 for registering the information of an activated communication service for the calling subscriber terminal 1 and the called subscriber data division 710 for registering the information of an activated communication service for the called subscriber terminal 1. The switching system 2 according to the second embodiment is provided with a main memory 70 for a main processor, a file storage device 72 for the main processor, a main memory 71 for a call processor and a file storage device 73 for the call processor. The called subscriber data division 710 is stored in the file storage device 72 for the main processor and the calling subscriber data division 700 is stored in the file storage device 73 for the call processor.

The character string registration table 8 is stored in the file storage device 72 for the main processor and when the switching system 2 is activated, the contents of the character string registration table 8 are written to the main memory 71 for the call processor. Therefore, when the switching system operates, the call processor (CPR) reads a character string showing the name of a communication service, referring to the character string registration table 8 stored in the main memory 71 for the call processor.

The called subscriber data division 710 consists of plural hierarchical tables based on the terminating line numbers. For example, in case the terminating line number is a four-digit number such as (0000) XXXX, the addresses of the second-level table are stored on the basis of station number in the first-level table. The addresses of the third-level table are stored on the basis of value (0 to 9) at the fourth digit from the low rank of a terminating line number in the second-level table. The addresses of the fourth-level table are stored on the basis of value (0 to 9) at the third digit from the low rank of a terminating line number in the third-level table. Further, the fourth-level table is provided with a possessed service identification flag storage area (SVCLS) to store a flag for identifying a communication service of which a subscriber terminal 1 is a member as a called subscriber and a service status identification flag storage area (SVST) to store a flag for identifying an activated communication service of communication services on the basis of value at the first and second digits from the low rank of a terminating line number. (See FIG. 7.)

In the above-mentioned flag storage area, plural one-bit flags can be stored. The storage position of a flag (bit position) is identified for each communication service. Further, each bit position of a possessed service identification flag storage area (SVCLS) and an activated service identification flag storage area corresponds to the same communication service. Each bit position corresponding to each communication service is common in any table.

The subscriber data controller 5 is provided with the subscriber data reader 5a to read the identified data from the subscriber data division 7 and the subscriber data writer 5b to write the identified data. In case of identifying a communication service activated for a subscriber terminal 1, the subscriber data reader 5a retrieves each table of the called subscriber data division 710 according to the terminating line number of the subscriber terminal 1. The bit position in which the flag "1" is on is detected, referring to each flag in the possessed service identification flag storage area (SVCLS) in a table correspondent to a terminating line number. The bit position in which the flag "1" is on is also detected, referring to each flag in the service status identification flag storage area (SVST). Then, the bit position in which the flag "1" is on is identified in both flag storage areas. Then, the subscriber data reader 5a refers to a service number conversion table (not shown) stored in a system data division 720 in the main memory 71 for the call processor according to the information of the bit position and converts the information of the bit position to a service number identifying an independent communication service.

Further, in the fourth-level table, a group subscriber identification flags to identify whether or not the subscriber terminal 1 is a member of the identified communication service group and group numbers to identify the group are stored.

On the other hand, the calling subscriber data division 700 consists of plural hierarchical tables based on the physical position of the subscriber line connected to each subscriber terminal 1 as the above-mentioned called subscriber data division 710. The information of a communication service related to each subscriber terminal 1 is stored in a service status identification flag storage area (SVST), a possessed service identification flag storage area (SVCLS), a group subscriber identification flag storage area and a group number storage area as the above-mentioned called subscriber data division 710.

Figure 8:
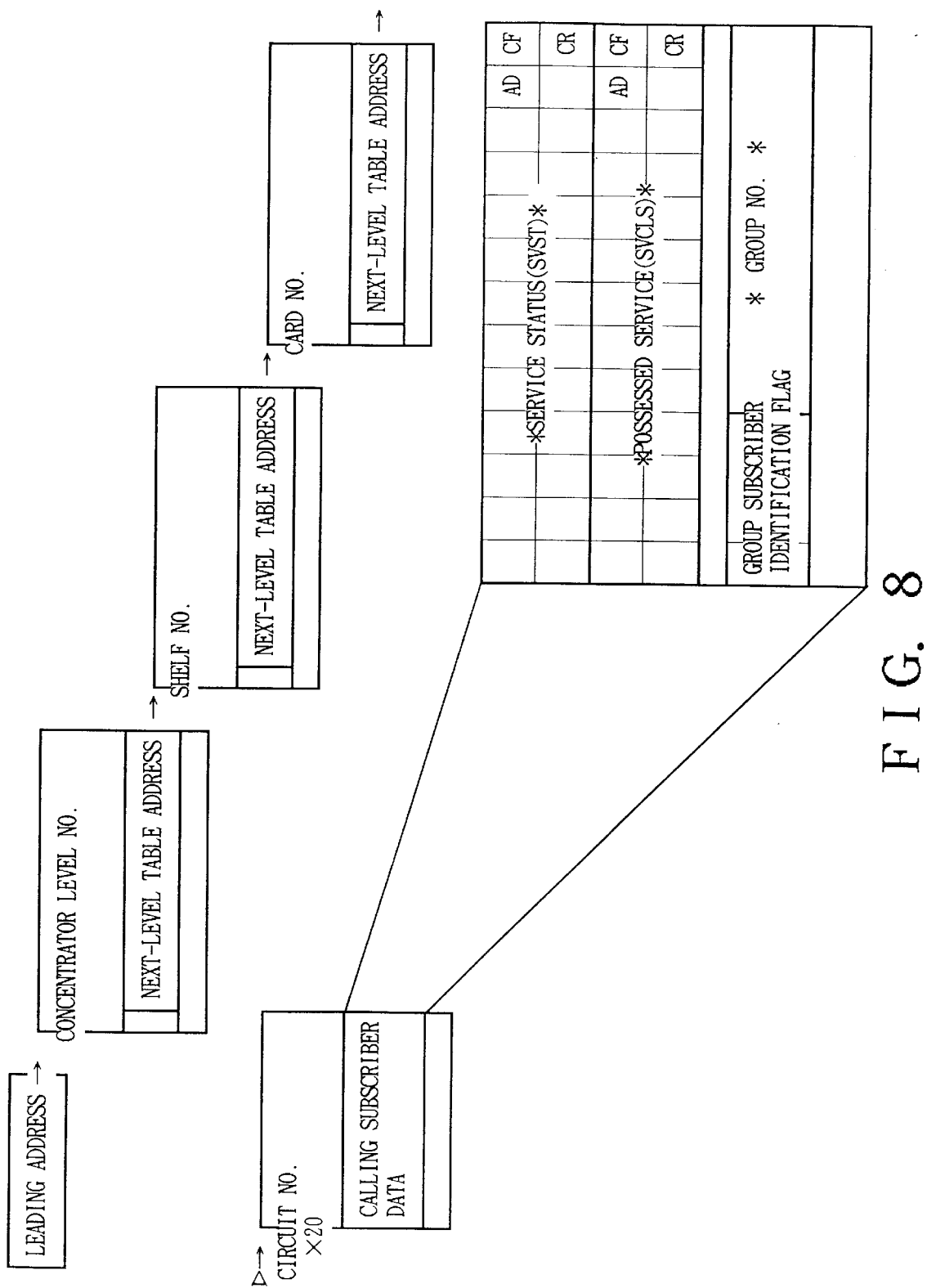
FIG. 8 shows an example of data division of subscribers of the calling party according to the second embodiment.

Further, the calling subscriber data division 700 is provided with a message number storage area in which the number of stored messages for the subscriber terminal 1 is stored in case a subscriber terminal 1 is a member of an automatic answering telephone service. (See FIG. 8.)

Of each flag of the calling and called subscriber data divisions 700 and 710, a possessed service identification flag (SVCLS) is turned on or off by a command issued by the provider of ISDN. A service status identification flag (SVST) is turned on or off by a request pulse from a subscriber terminal.

Further, the message number stored in the calling subscriber data division 700 is updated by a call processor (CPR) when termination of recording is informed by a message storage device 9. However, in the second embodiment, the signal analyzer 4 shown in FIG. 5 controls the above-mentioned data.

Figure 9:
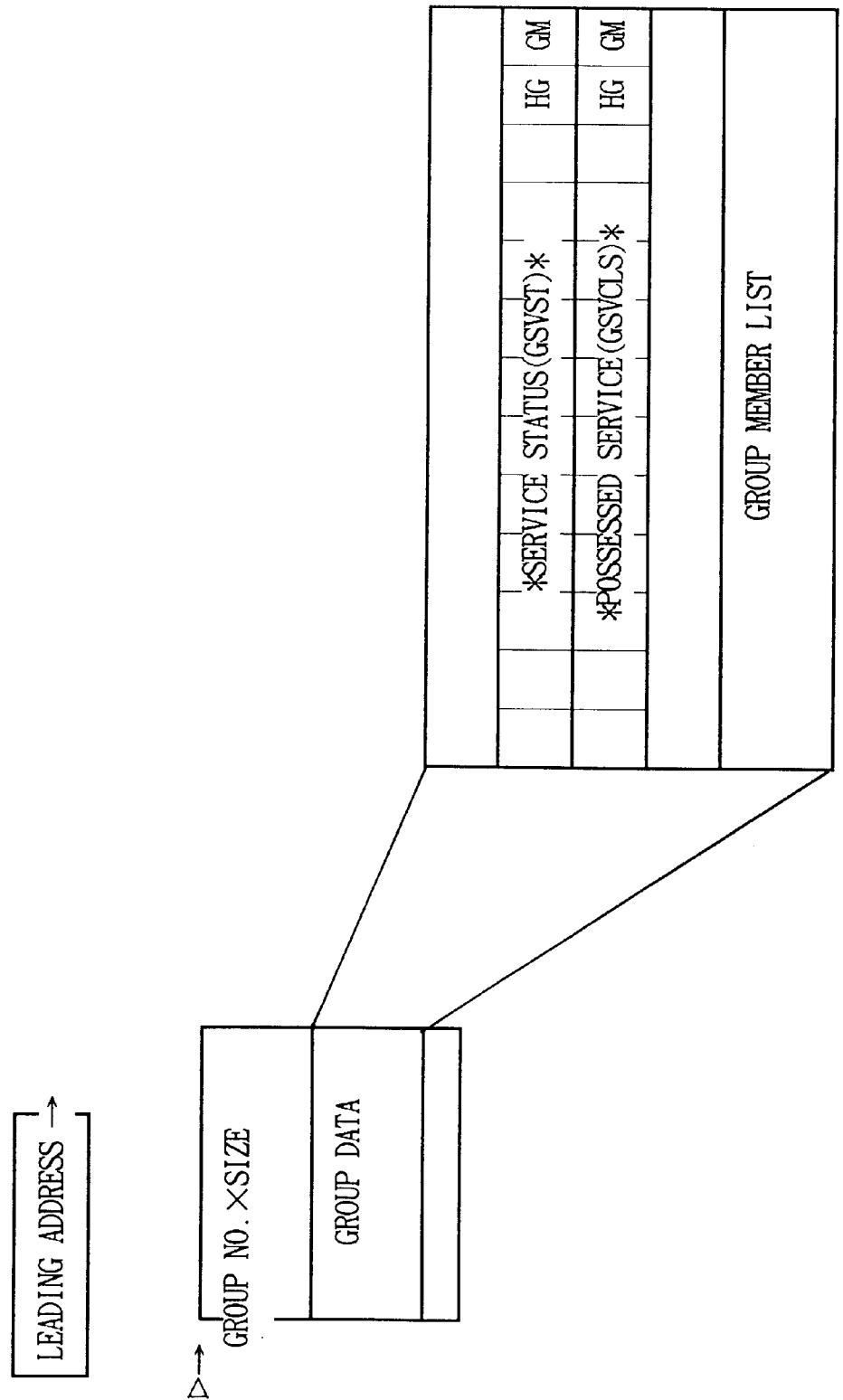
FIG. 9 shows an example of a group data division according to the second embodiment.

Next, the group data division 730 is provided with a possessed service identification flag storage area (GSVCLS) to store a flag for identifying a communication service of which each group is a member and a service status identification flag storage area (GSVST) to store a flag for identifying an activated communication service on the basis of group number to identify an independent group. The group data division 730 also stores a member list of each group. The interior configuration of the possessed service identification flag storage area (GSVCLS) and the service status identification flag storage area (GSVST) in the group data division 730 is the same as that of the above-mentioned called subscriber data division 500 and description will be omitted. (See FIG. 9.)

FIG. 10 shows an example of a character string registration table 8 according to the second embodiment. character string registration table 8 stores character strings showing the name of a communication service on the basis of service number to identify an independent communication service. In FIG. 10, 8 bytes are allocated to each communication service and character strings represented by IA5 character code are stored. For example, when a subscriber data controller 5 detects the identified bit position information from the calling subscriber data division 700, the called subscriber data division 710 or a group data division 730 and converts the bit position information to a service number "1" referring to a service number conversion table, a signal generator 6 can retrieve the character string registration table 8 according to the service number "1" and read a character string, "CCLRCC*".

FIG. 11 shows the configuration of SETUP ACK signal, a message at layer 3 of ISDN.

As shown in FIG. 11, the display information elements are identified by ITUTC (CCITT) recommendation Q. 931 VI. 8 3.1. 17 as follows:

1. Provide display information which can be displayed on a user's terminal.
2. The information to be identified as an information element must be coded by IA5.
3. The maximum default length of an information element shall be 34 or 82 octet (byte) depending on a network.
4. If a user receives a display information element too long to be processed, he should display it with the end cut. (Omitted) As a character in IA5 code is equivalent to one byte, maximum 34 or 82 characters can be identified. That is, in embodiment 2, a signal generator 6 accesses to a character string registration table 8 according to service number information detected by a subscriber data controller 5 and reads the character string showing the name of a communication service activated for a subscriber terminal 1. Then, the signal generator 6 writes the read character string to a display information element of SETUP ACK signal. For example, as the character string of each communication service in a character string registration table 8 is 8 bytes max., at least ten names of communication services (in case a display information element is 82 octet long) (four names in case of 38 octet) can be written.

The operations of a signal transmission system according to the second embodiment will be described.

Figure 12:
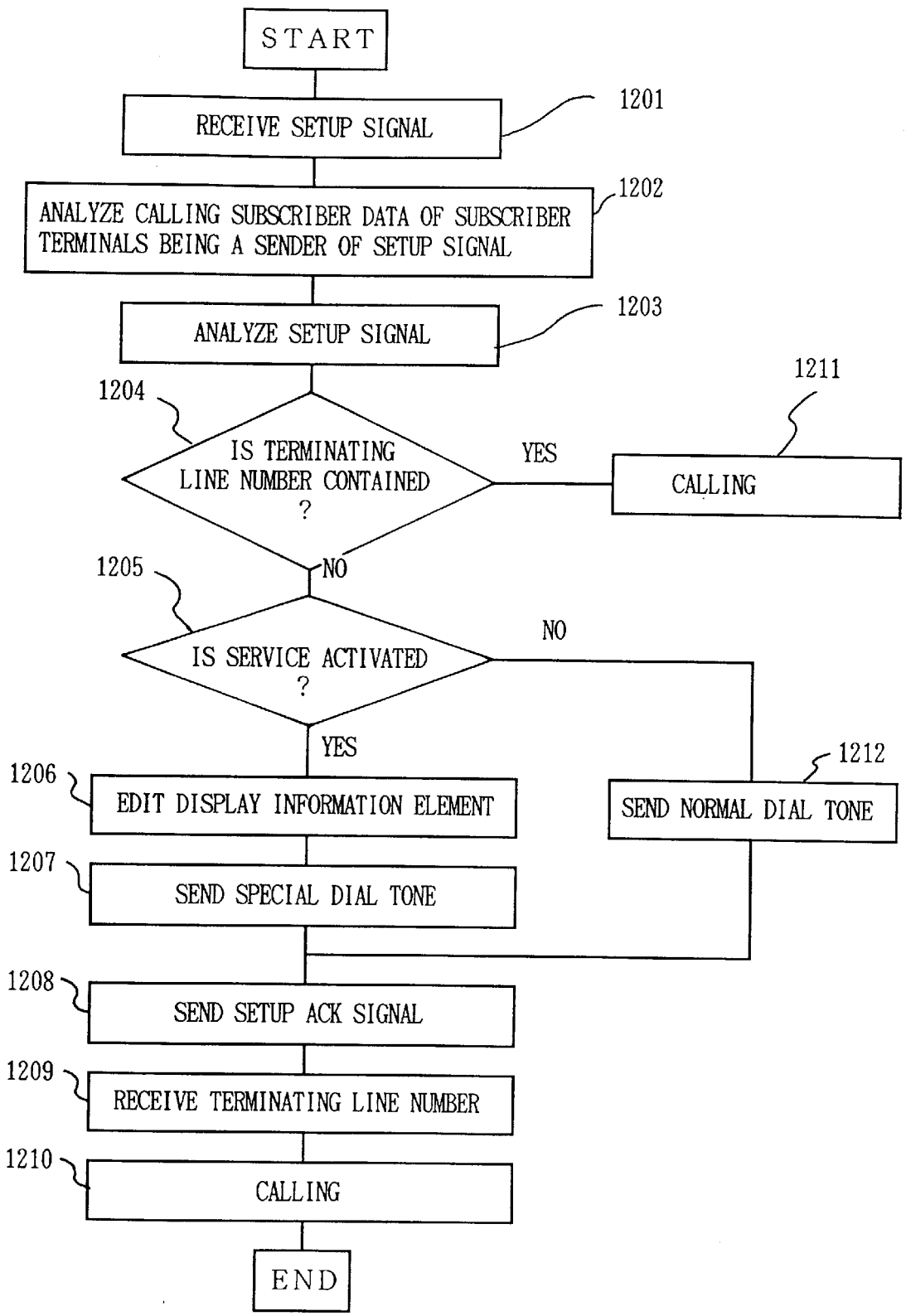
FIG. 12 is a flow-chart showing the operations of the switching system according to the second embodiment.

FIG. 12 is a flow-chart showing the operations of the switching system 2.

When the switching system 2 receives a call setup request signal (SETUP signal) from a subscriber terminal 1 (step 1201), it accesses to the calling subscriber data division 700 in memory 5 according to the position of the subscriber line of a subscriber terminal 1, reads the calling subscriber data of the subscriber terminal 1 and stores it in a transaction in memory 5. Then, the switching system judges whether or not the call setup request signal is proper according to the calling subscriber data. (step 1202) If the call setup request signal is proper, a signal analyzer 4 analyzes the signal and judges whether or not the terminating line number is included. (steps 1203 and 1204.)

If the call setup request signal contains the terminating line number, a switching system 2 activates calling according to the terminating line number (step 1212.) On the other hand, if the call setup request signal contains no terminating line number, the switching system retrieves the calling and called subscriber data of a subscriber terminal 1 and the group data, and judges whether or not an activated communication service exists. (step 1205.) If an activated communication service exists, the switching system edits a display information element (step. If no activated communication service exists, transmitter and receiver 3 on the side of the switching system sends a normal dial tone to a subscriber terminal 1 (step 1212.)

After a dial tone is sent, the signal generator 6 writes the display information element edited in the step 1205 to a call setup request acknowledgment signal (SETUP ACK signal) and sends it to a subscriber terminal 1 via transmitter and receiver 3 on the side of the switching system (step 1208.)

Then, if the switching system receives the terminating line number from a subscriber terminal 1 (step 1209), it activates calling according to the terminating line number (step 1210.)

Figure 13:
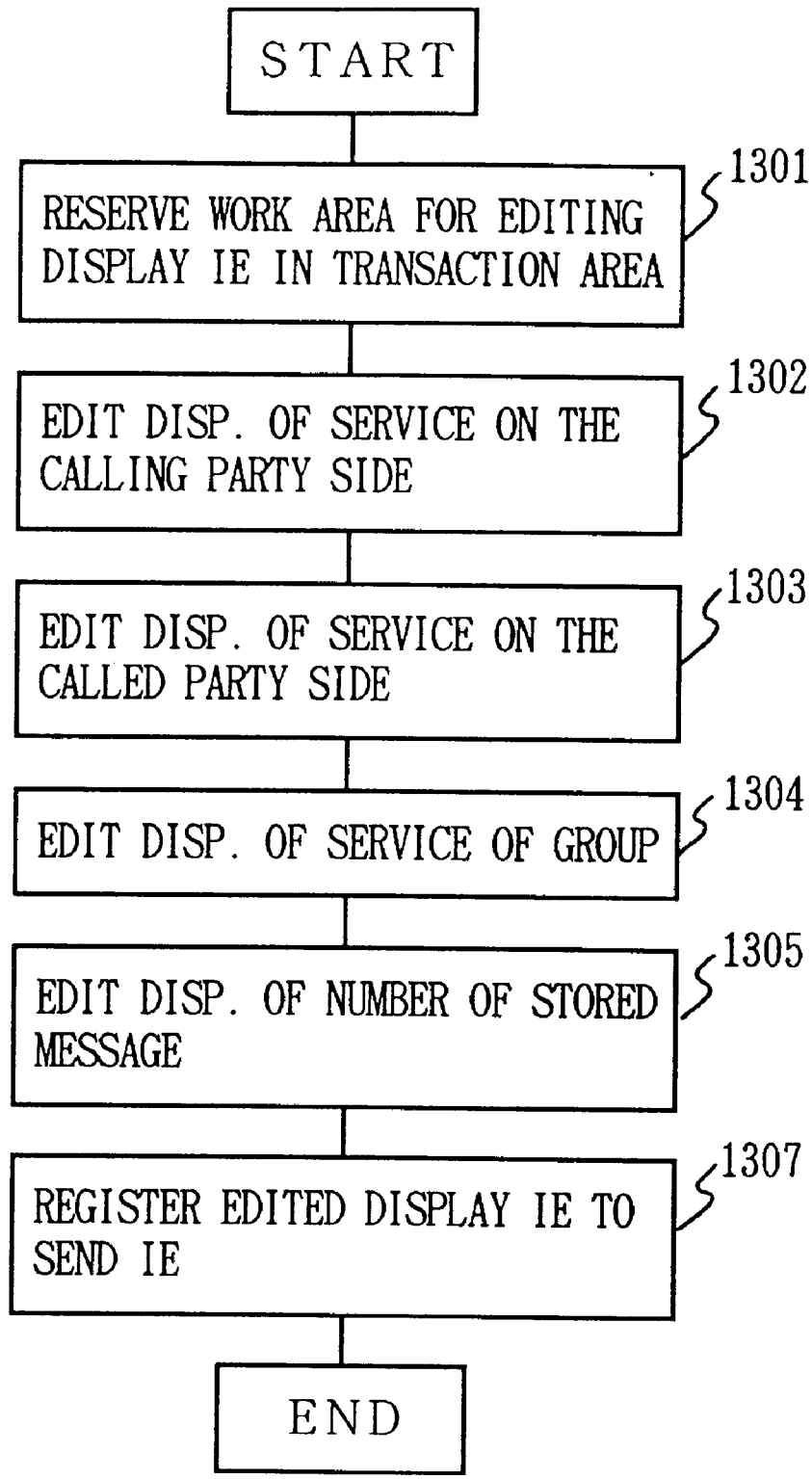
FIG. 13 is a flow-chart showing the edit process of display information elements according to the second embodiment.

FIG. 13 is a flow-chart showing the process of editing display information elements.

The subscriber data controller 5 according to the second embodiment secures a transaction to edit a display information element in the memory (step 1301.)

The subscriber data controller 5 retrieves the calling subscriber data read out in memory and checks whether an activated communication service exists or not. If an activated communication service exists, the subscriber data controller detects the service number information to identify the activated communication service using a service number conversion table and informs the signal generator 6 of it.

The signal generator 6 accesses to a character string registration table 8 according to the service number information, reads a character string showing the name of the activated communication service and writes the character string to the transaction (step 1302.)

Next, the subscriber data controller 5 accesses to the called subscriber data division 710 in memory 5 (a file storage device 72 for a main processor) according to the terminating line number of a subscriber terminal 1 and checks whether or not an activated communication service exists out of the communication services of which the subscriber terminal is a member as the called subscriber. If an activated communication service exists, the subscriber data controller detects the service number information of the communication service and informs the signal generator 6 of it.

The signal generator 6 writes the character string to the transaction (step 1303.)

Similarly, the subscriber data controller 5 accesses to the group data division 730 in memory 70 (a file storage device 52 for a main processor) according to the group number of the group of which a subscriber terminal 1 is a member, checks whether a communication service activated for the group exists or not and detects the service number of the communication service using a service number conversion table. The signal generator 6 accesses to a character string registration table 8 according to the service number information detected by the subscriber data controller 5, reads a character string showing the name of a communication service activated for the group and writes the character string to the transaction (step 1304.)

Further, if a subscriber terminal 1 is a member of an automatic answering telephone service, the signal generator 6 reads the number of stored messages for the subscriber terminal 1 from the calling subscriber data via the subscriber data controller 5 and writes the number to the transaction (step 1305.)

The signal generator 6 writes the data written in a transaction for editing as a result of the steps 1302 to 1305 to a display information element of a call setup request acknowledgment signal (SETUP ACK signal) (step 1306.)

Figure 14:
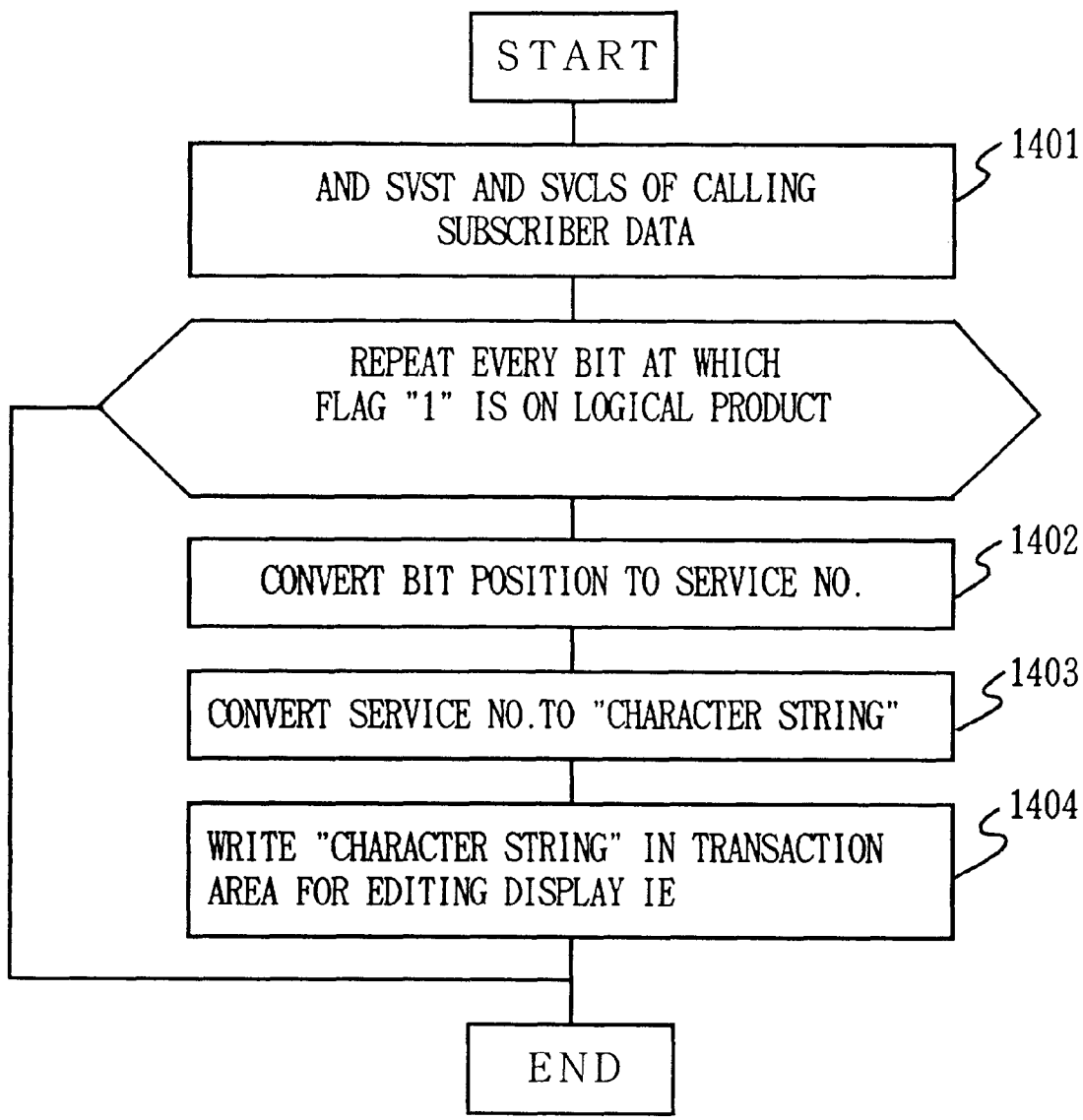
FIG. 14 is a flow-chart showing the edit process of the service information for subscribers of the calling party according to the second embodiment.

Next, the process of editing service information for the calling subscriber shown in FIG. 14 will be described in detail.

The signal generator 6 retrieves the calling subscriber data 500 written to a transaction in memory 70 via the subscriber data controller 5. Then, the signal generator ANDs each flag in a service status identification flag storage area (SVST) and a possessed service identification flag storage area (SVCLS) and detects the bit position in which the flag "1" is on both in the service status identification flag storage area (SVST) and in the possessed service identification flag storage area (SVCLS) (step 1401.) The subscriber data controller 5 accesses to a service number conversion table in memory (main memory 71 for the call processor), converts the bit position information detected in the step 1401 to the service number and informs the signal generator 6 of it (step 1402.)

The signal generator 6 accesses to the character string registration table 8 in memory (main memory 71 for the call processor) and reads the character string corresponding to the service number. (step 1403) Further, the signal generator 6 writes the character string to a transaction for editing (step 1404.)

The processing in the steps 1402 to 1404 are performed for the each bit at which the flag "1" is on in AND.

Figure 15:
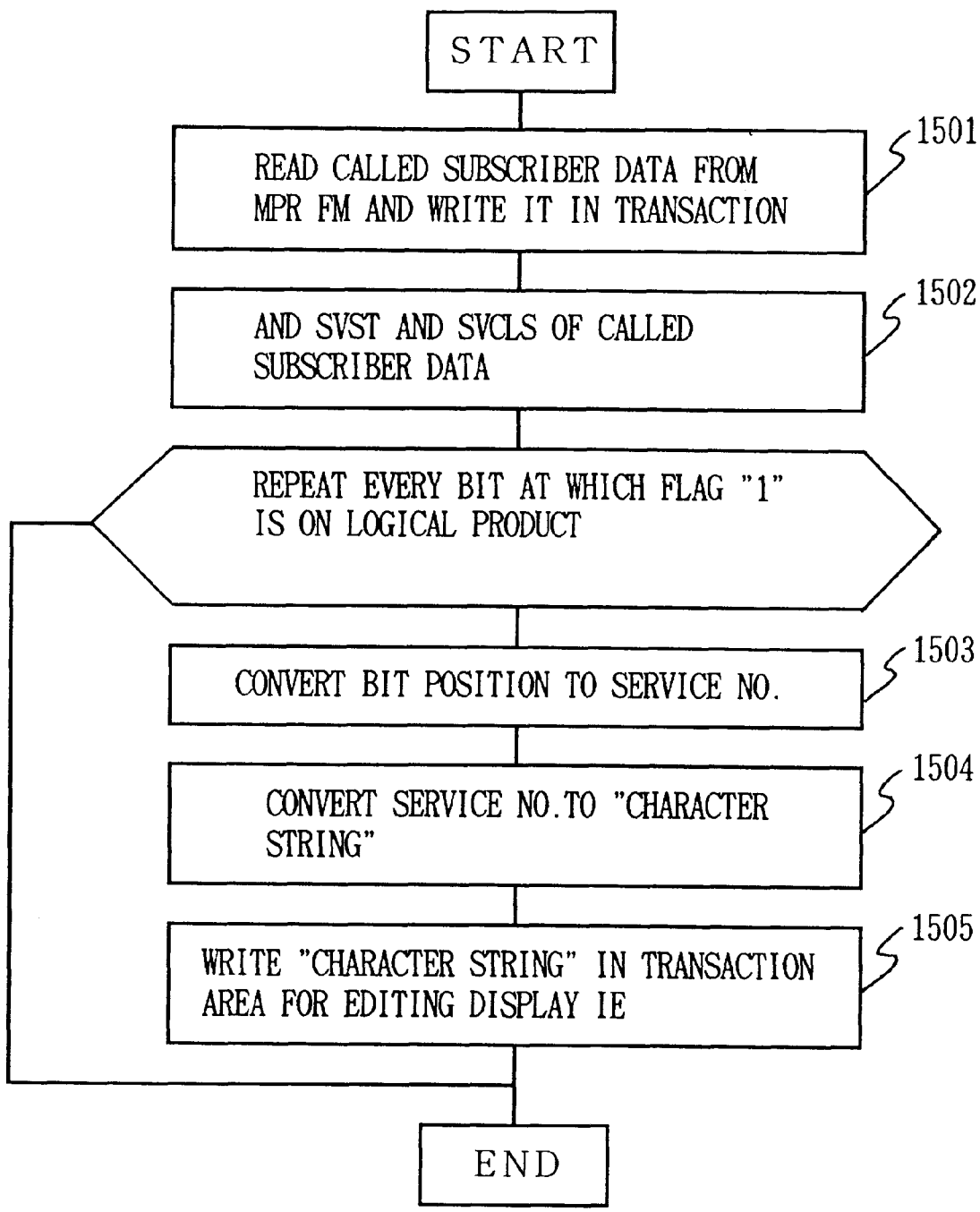
FIG. 15 is a flow-chart showing the edit process of the service information for subscribers of the called party according to the second embodiment.

FIG. 15 is a flow-chart showing the process of editing service information for the called subscriber according to the second embodiment.

The signal generator 6 accesses to the called subscriber data division 710 in the memory (a file storage device 72 for the main processor) via the subscriber data controller 5, checks the called subscriber data corresponding to the terminating line number of a subscriber terminal 1 and writes the called subscriber data to a transaction in that memory. (step 1501.)

The subscriber data controller 5 retrieves the called subscriber data written to the transaction, ANDs the flag which is on in the same bit position both in a service status identification flag storage area (SVST) and in a possessed service identification flag storage area (SVCLS) and detects the bit position in which the flag "1" is on both in the service status identification flag storage area (SVST) and in the possessed service identification flag storage area (SVCLS). (step 1502)

The subscriber data controller 5 accesses to a service number conversion table in the memory (main memory 71 for the call processor), detects the service number corresponding to the bit position detected in the step 1502 and informs the signal generator 6 of it (step 1503.)

The signal generator 6 accesses to a character string registration table in the memory (main memory 71 for a call processor) and reads the character string corresponding to the service number. (step 1504) Further, the signal generator 6 writes the character string to a transaction for editing (step 1505.)

The processing in the steps 1503 to 1505 is performed for the each bit at which the flag "1" is on in AND.

Figure 16:
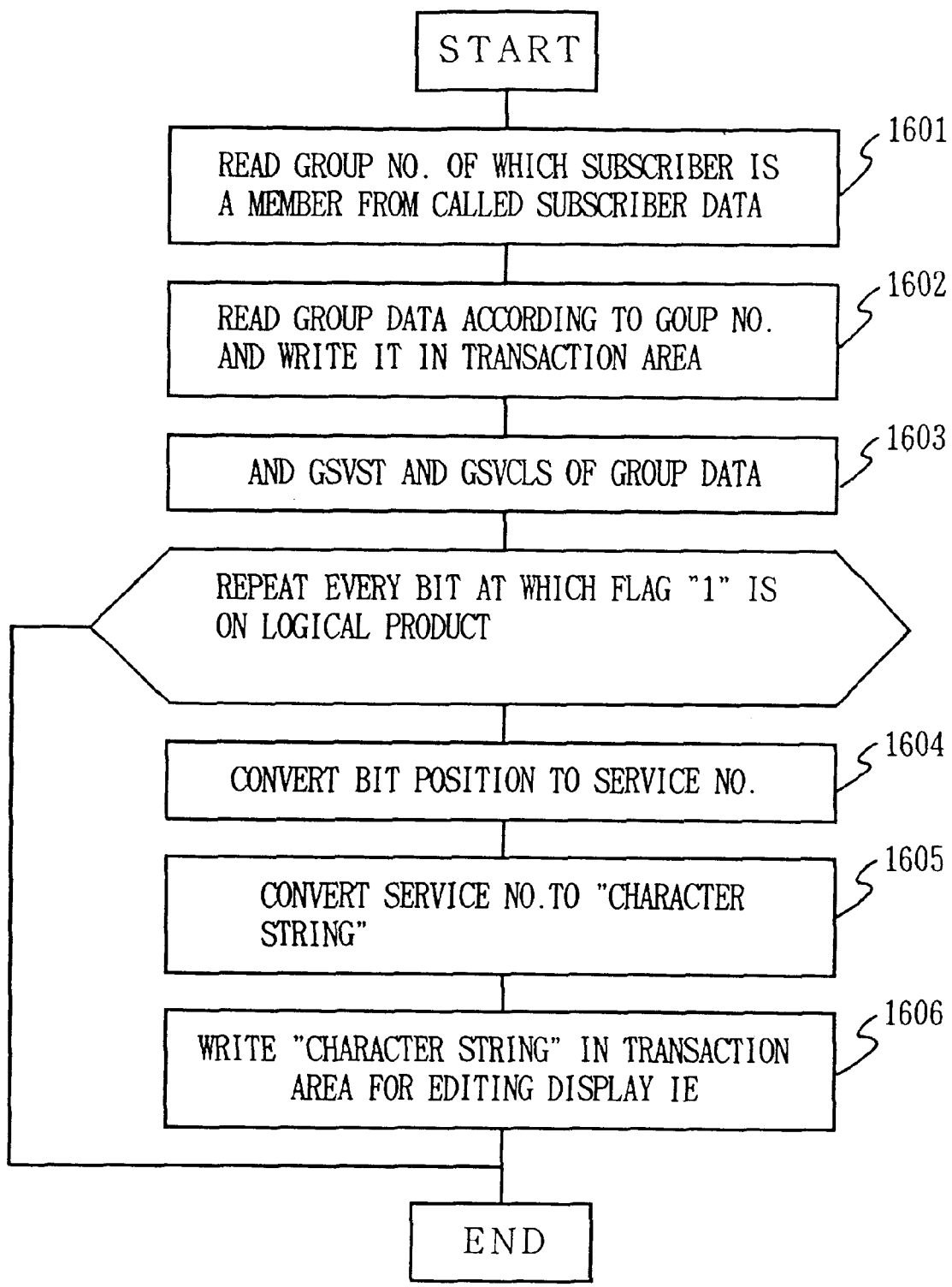
FIG. 16 is a flow-chart showing the edit process of the group service information according to the second embodiment.

FIG. 16 is a flow-chart showing the process of editing service information for a subscriber who is a member of a group in the second embodiment.

The signal generator 6 retrieves the calling subscriber data written to a transaction in memory via a subscriber data controller 5 and checks whether or not the flag "1" is on in a group subscriber identification flag storage area. If the flag "1" is on, the signal generator reads the group number of the group of which the subscriber terminal 1 is a member from a group number storage area (step 1601.)

Further, the subscriber data controller 5 accesses to a group data division 730 in the memory (a file storage device 72 for the main processor) according to the group number and writes the group data corresponding to the group number to a transaction in memory (step 1602.)

Further, the subscriber data controller 5 retrieves the group data written to the transaction and ANDs a flag in the same bit position both in a service status identification flag storage area (GSVST) and in a possessed service identification flag storage area (GSCLT). The subscriber data controller detects the bit position in which the flag "1" is on both in the service status identification flag storage area (GSVST) and in the possessed service identification flag storage area (GSCLT) (step 1603.)

The subscriber data controller 5 accesses to a service number conversion table in the memory (main memory 71 for the call processor), detects the service number corresponding to the bit position detected in the step 1603 and informs a signal generator 6 of it (step 1604.)

The signal generator 6 accesses to a character string registration table 8 in the memory (main memory 71 for the call processor) and reads the character string corresponding to the service number (step 1605.) Further, the signal generator 6 writes the character string to a transaction for editing (step 1606.)

The processing in the steps 1604 to 1606 is performed for the each bit at which the flag "1" is on in AND.

Figure 17:
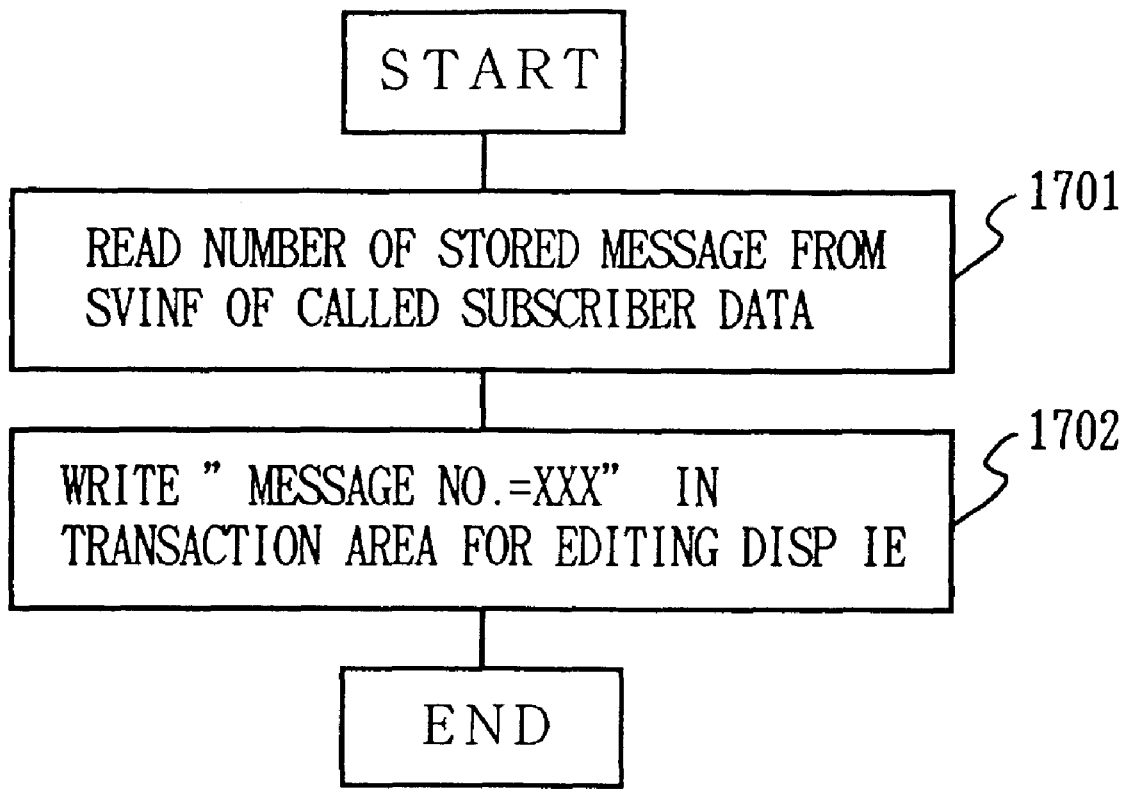
FIG. 17 is a flow-chart showing the edit process of the number of stored messages according to the second embodiment.

FIG. 17 is a flow-chart showing the process of editing the number of stored messages according to the second embodiment.

The subscriber data controller 5 retrieves the calling subscriber data written to a transaction and checks whether or not the number of stored messages is stored in a message number storage area. If the number is stored, the subscriber data controller reads it and informs a signal generator 6 of it (step 1701.)

The signal generator 6 composes the number of stored messages and the predetermined character string (MESSAGE NO.=). It writes the composed character string to a transaction for editing in the memory (step 1702.)

The process of updating data in a message number storage area will be described.

Figure 18:
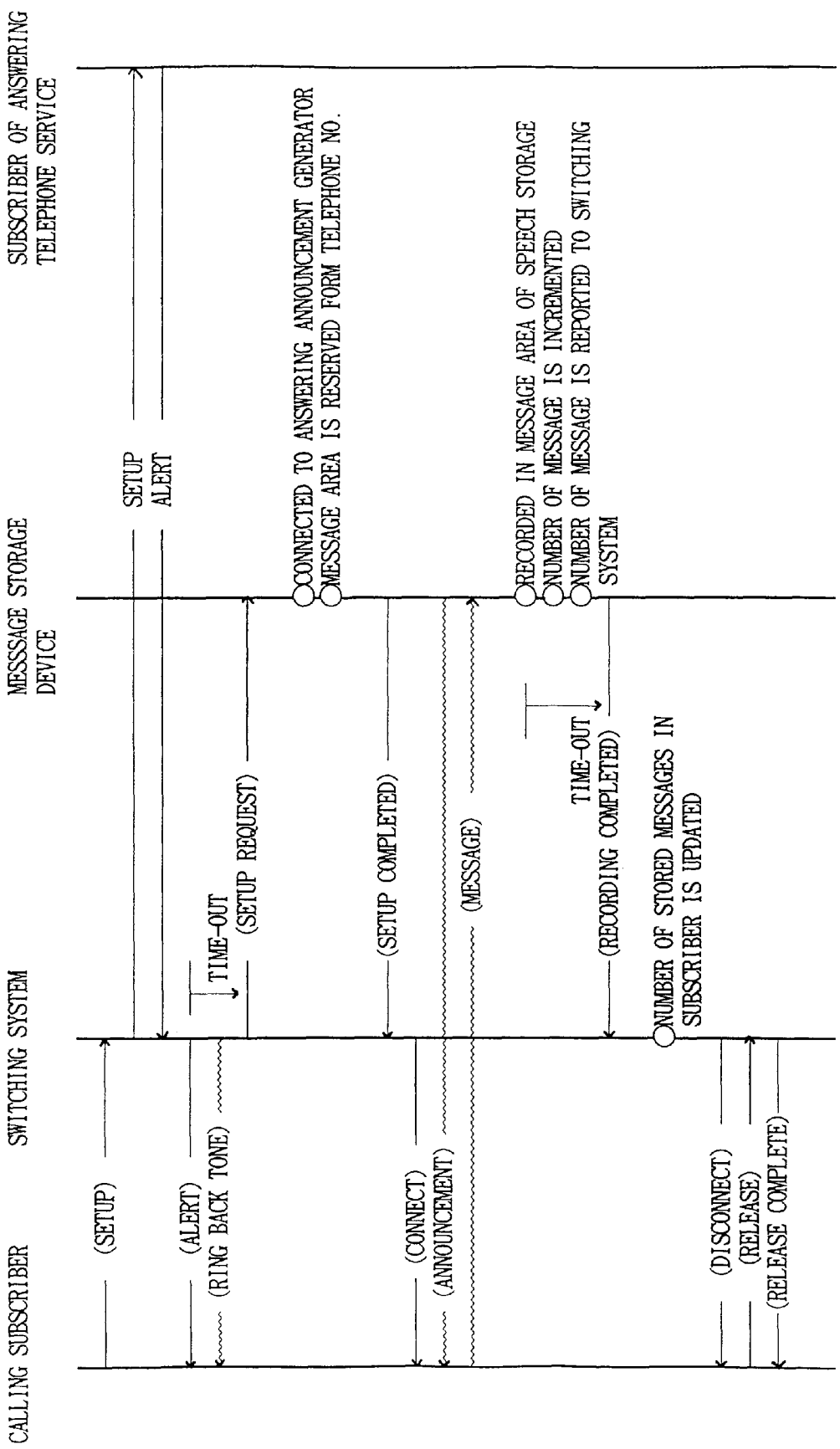
FIG. 18 is a sequence diagram showing the operations between the switching system and a message storage device in case the number of stored messages is updated according to the second embodiment.

FIG. 18 is a diagram showing the sequence of operations of the message storage device 9 and the switching system 2 when a subscriber calls a subscriber terminal 1 which is a member of an automatic answering telephone service.

When the switching system 2 receives a call setup request signal (SETUP signal) from the calling subscriber, it detects the terminating line number of the called subscriber terminal 1 from the call setup request signal (SETUP signal) and checks whether the called subscriber terminal 1 is a member of an automatic answering telephone service according to the terminating line number.

If the called subscriber terminal 1 is a member of the automatic answering telephone service, the switching system sends a call setup request signal (SETUP signal) sent by the calling subscriber to the called subscriber terminal 1 and starts measurement of the identified time.

If the called subscriber terminal 1 makes no response for the identified time, switching system 2 sends request for connection to the calling subscriber to message storage device 9 and specifies a message line between the message storage device 9 and the calling subscriber.

At this time, in the message storage device 9, the message controller 9d connects the announcement generator 96 to the message line and sends the answering announcement to the calling subscriber.

The message controller 9d secures a message area in message storage memory 9a and stores a message sent by the calling subscriber. Further, the message controller 9d informs the database controller 9c of the area number showing the area in which the message is stored, the terminating line number of the calling subscriber terminal and the terminating line number of the called subscriber terminal 1.

In the database controller 9c, the database processor 91 accesses to the subscriber database 92 according to the terminating line number of the called subscriber terminal 1 and stores the terminating line number of the calling subscriber terminal and the area number. The database processor also accesses to the accounting database 93 and updates the accounting data related to the called subscriber terminal 1.

The message controller 9d also sends the number of stored messages for the called subscriber terminal 1 to the switching system 2 and informs the switching system that recording a message is completed.

In the switching system 2, the subscriber data writer 5b of the subscriber data controller 5 retrieves the calling subscriber data division 700 according to the position of local loop of the called subscriber terminal 1 and determines the position of calling subscriber of the called subscriber terminal 1. The subscriber data writer 5b increases the value stored in a message number storage area in the calling subscriber data by "1".

On the other hand, the switching system 2 disconnects a message line identified between the calling subscriber and the message storage device 9 and releases a call.

What is claimed is:

1. A signal transmission method in a switching system, connected to a subscriber terminal via a communication line including a control signal channel and a message channel, the method comprising the steps of:

receiving a call setup request signal from said subscriber terminal;

detecting a terminal identification information of said subscriber terminal to respond to said call setup request signal;

searching for a service identification information indicating a communication service selected by the terminal subscriber and being available to the terminal subscriber on the basis of the terminal identification information;

providing the service identification information in a call setup request acknowledgement signal to be transmitted to said subscriber terminal;

transmitting the call setup request acknowledgment signal to said subscriber terminal which indicates the communication service selected by said subscriber terminal; and equipping said switching system with a subscriber data registration means for registering service identification information of a communication service selected by each subscriber terminal and being available to each terminal subscriber, for each terminal identification information for identifying each subscriber terminal and a type of communication service registration table for registering a type of communication service indicative of each communication service for each service identification information, and executing in said switching system the steps of:

detecting a terminal identification information of said subscriber terminal from said call setup request signal unless a terminal line number is included in said call setup request signal after analysis of said call setup request signal;

searching for service identification information of the communication service selected by the subscriber terminal and being available to the subscriber terminal by retrieving said subscriber data registration means on the basis of said terminal identification information;

reading-out a type of communication service of said communication service selected by the subscriber terminal and being available to the subscriber terminal by retrieving the type of communication service registration table on the basis of the service identification information;

providing the type of communication service in the call setup acknowledgement signal to be transmitted to said subscriber terminal in response to said call setup request signal; and transmitting the call setup request acknowledgement signal to said subscriber terminal.

2. A signal transmission method according to claim 1, wherein said providing step includes the step of writing the type of communication service identifying the communication service selected by said subscriber terminal and being available to said subscriber terminal in a display information element of the call setup request acknowledgement signal.

3. A signal transmission method according to claim 1, comprising the steps of: connecting said switching system to a message storage device which stores messages to those subscriber terminals which do not respond to calls and transmits said messages at the request of each of the subscriber terminals, wherein said subscriber data registration means registers the number of messages to said subscriber terminals in addition to the service identification information of a communication service selected by the subscriber terminal and being available to the subscriber terminal, transmitting by said message storage device to said switching system said terminal identification information of said subscriber terminals and the number of stored messages to said subscriber terminals when said message storage device stores the messages to said subscriber terminals, and retrieving by said switching system said subscriber data registration means on the basis of the terminal identification information received from said message storage device and replacing the number of messages registered in said subscriber data registration means with the number of messages received from said message storage device.

4. A signal transmission method according to claim 3, wherein:

in said detecting step, when a call setup request signal is received from said subscriber terminal, it is checked whether or not said call setup request signal contains the terminating line number and terminal identification information of said subscriber terminal;

in said searching step, said subscriber data registration means are retrieved according to terminal identification information detected in said detecting step and service identification information of a communication service selected by the subscriber terminal and the number of stored messages are detected;

in said reading-out step, said type of communication service registration table is retrieved according to service identification information searched in said searching step and the type of communication service is read out;

said providing step, the number of stored messages searched in said searching step and the type of communication service read-out in said reading-out step are provided in the call setup request acknowledgement signal to be sent to said subscriber terminal; and in said transmitting step, the call setup request acknowledgement signal made by said providing step is sent to said subscriber terminal via a control signal channel.

5. A signal transmission method according to claim 1, further comprising the step of equipping said subscriber data registration means with a service information registration section for registering service identification information of a communication service selected by each subscriber terminal and being available to each subscriber terminal on the basis of terminal identification information of a subscriber terminal and a group data registration section for registering service identification information of a communication service selected by each subscriber terminal group of which a subscriber terminal is a member and being available to each subscriber terminal group, wherein said searching step includes:

a service information searching step in which said service information registering section is retrieved according to terminal identification information of said subscriber terminal and service identification information of a communication service selected by said subscriber terminal and being available to said subscriber terminal is searched, and a group data searching step in which said group data registering section is retrieved according to said group identification information and service identification information of a communication service selected by a subscriber terminal group of which a subscriber terminal is a member and being available to said subscriber terminal group is searched; and said providing step includes:
- a type of communication service detecting step in which said type of communication service registration table is retrieved according to service identification information searched in said service information searching step and the type of communication service of a communication service selected by said subscriber terminal and being available to said subscriber terminal is searched, and
- a type of communication service detecting step in which said type of communication service registration table is retrieved according to service identification information searched in said group data searching step and the type of communication service of a communication service selected by said subscriber terminal group and being available to said subscriber terminal group is searched.

6. A switching system connected to a subscriber terminal via a communication line including a control signal channel and a message channel, the system comprising:

receiving means for receiving a call setup request signal including a terminal identification information of the subscriber terminal;

storage means for registering a service identification information indicating a type of a communication service selected by the subscriber terminal and being available to the subscriber terminal;

searching means for retrieving said storage means to provide the service identification information, in response to the terminal identification information from said receiving means;

signal generation means for generating a call setup request acknowledgement signal to be sent in response to said call setup request signal and for providing the service identification information which is searched by said searching means in the call setup request acknowledgement signal; and transmission means for transmitting the call setup request acknowledgement signal to said subscriber terminal via the control signal channel which indicates the communication service selected by said subscriber terminal; and wherein said storage means includes subscriber data registration means for registering service identification information of a communication service selected by each subscriber terminal and being available to each subscriber terminal on the basis of terminal identification information to identify a subscriber terminal and a type of a communication service registration table for registering a type of a communication service indicative of each communication service on the basis of service identification information, and further comprising:

detecting means for detecting terminal identification information of said subscriber terminal if the call setup request signal received from said subscriber terminal contains no terminating line number, after said call setup request signal has been analyzed, said searching means retrieving said subscriber data registration means according to terminal identification information detected by said detecting means and detecting service identification information of a communication service selected by said subscriber terminal and being available to said subscriber terminal, said signal generation means retrieving said type of communication service registration table according to service identification information detected by said searching means, detecting the type of said communication service and providing said type of communication service in the call setup request acknowledgement signal to be sent in response to said call setup request signal, and said transmission means sending the call setup request acknowledgement signal generated by said signal generating means to said subscriber terminal via said control signal channel.

7. A switching system according to claim 6, wherein said switching system is connected to a message storage device which stores messages to those subscriber terminals which do not respond to calls and transmits said messages at the request of each of the subscriber terminals, and wherein said subscriber data registration means registers the number of messages to said subscriber terminals in addition to the service identification information of a communication service activated for each subscriber terminal.

8. A switching system according to claim 7, wherein when said signal generation means generates a call setup request acknowledgement signal, said signal generation means adds the number of stored messages for said subscriber terminal to said call setup request acknowledgement signal in addition to a service identification information identifying the type of said communication service for said subscriber terminal.

9. A switching system according to claim 5, wherein said subscriber data registration means is provided with a service information register for registering service identification information of a communication service activated for each subscriber terminal on the basis of terminal identification information of an individual subscriber terminal and a group data register for registering service identification information of a communication service activated for each subscriber terminal group on the basis of group identification information to identify a subscriber terminal group to which each subscriber terminal belongs, wherein:

said searching means retrieves the service information register on the basis of terminal identification information of said subscriber terminal and detects service identification information of a communication service activated for said subscriber terminal while, at the same time, retrieves said group data register on the basis of said terminal identification information and detects service identification information of a communication service activated for a subscriber terminal group to which said subscriber terminal belongs;

said signal generation means retrieves said type of communication service registration table on the basis of service identification information detected by said searching means and detects a type of communication service of the communication service activated for said subscriber terminal and a type of communication service activated for a subscriber terminal group to which said subscriber terminal belongs and provides the type of communication service to said call setup request acknowledgement signal to be sent to said subscriber terminal.

10. A switching system connected to a subscriber terminal via a communication line including a control signal channel and a message channel, the system comprising:

receiving means for receiving a call setup request signal including a terminal identification information of the subscriber terminal;

storage means for registering a service identification information indicating a type of a communication service selected by the subscriber terminal and being available to the subscriber terminal;

searching means for retrieving said storage means to provide the service identification information, in response to the terminal identification information from said receiving means;

signal generation means for generating a call setup request acknowledgement signal to be sent in response to said call setup request signal and for providing the service identification information which is searched by said searching means in the call setup request acknowledgement signal; and transmission means for transmitting the call setup request acknowledgement signal to said subscriber terminal via the control signal channel which indicates the communication service selected by said subscriber terminal; and wherein said subscriber data registration means is provided with a service information register for registering service identification information of a communication service selected by each subscriber terminal and being available to each subscriber terminal on the basis of terminal identification information of an individual subscriber terminal and a group data register for registering service identification information of a communication service selected by each subscriber terminal group and being available to each subscriber terminal group on the basis of group identification information to identify a subscriber terminal group to which each subscriber terminal belongs, wherein:

said searching means retrieves the service information register on the basis of terminal identification information of said subscriber terminal and detects service identification information of a communication service selected by said subscriber terminal and being available to said subscriber terminal while, at the same time, retrieves said group data register on the basis of said terminal identification information and detects service information of a communication service selected by a subscriber terminal group of which a subscriber terminal is a member and being available to said subscriber terminal group;

said signal generation means retrieves said type of communication service registration table on the basis of service identification information detected by said searching means and detects a type of communication service of the communication service selected by said subscriber terminal and being available to said subscriber terminal and a type of communication service selected by a subscriber terminal group of which a subscriber terminal is a member and being available to the subscriber terminal group and provides the type of communication service to said call setup request acknowledgement signal to be sent to said subscriber terminal.

11. A switching system, connected to a subscriber terminal via a communication line including a control signal channel and a message channel, the system comprising:

receiving means for receiving a call setup request signal including a terminal identification information of the subscriber terminal;

storage means for registering a service identification information indicating a type of a communication service selected by the subscriber terminal and being available to the subscriber terminal;

searching means for retrieving said storage means to provide the service identification information, in response to the terminal identification information from said receiving means;

signal generation means for generating a call setup request acknowledgement signal to be sent in response to said call setup request signal and for providing the service identification information which is searched by said searching means in the call setup request acknowledgement signal;

transmission means for transmitting the call setup request acknowledgement signal to said subscriber terminal via the control signal channel; and wherein said switching system is connected to a message storage device which stores messages to those subscriber terminals which do not respond to calls and transmits said messages at the request of each of the subscriber terminals, and wherein said subscriber data registration means registers the number of messages to said subscriber terminals in addition to the service identification information of a communication service activated for each subscriber terminal.

* * * * *